US012793701B1

(12) United States Patent
Hoehn

(10) Patent No.: US 12,793,701 B1
(45) Date of Patent: Nov. 10, 2026

(54) APPARATUS FOR AND METHOD OF MACHINE-LEARNING MODEL CONFIGURATION

(71) Applicant: AUTHOR.INC LLC, Austin, TX (US)

(72) Inventor: Charlie Hoehn, Austin, TX (US)

(73) Assignee: AUTHOR.INC LLC, Austin, TX (US)

( * ) Notice: Subject to any disclaimer, the term of this patent is extended or adjusted under 35 U.S.C. 154(b) by 0 days.

(21) Appl. No.: 19/382,465

(22) Filed: Nov. 7, 2025

(51) Int. Cl.
*G10L 15/02* (2006.01)
*G06V 30/41* (2022.01)
*G10L 15/26* (2006.01)

(52) U.S. Cl.
CPC .............. *G10L 15/02* (2013.01); *G06V 30/41* (2022.01); *G10L 15/26* (2013.01)

(58) Field of Classification Search
CPC .......... G10L 15/02; G10L 15/26; G06V 30/41
See application file for complete search history.

(56) References Cited

U.S. PATENT DOCUMENTS 8,913,103 B1* 12/2014 Sargin .................... G06V 40/16 348/14.12
10,985,850 B1* 4/2021 Ichapurapu ......... H04W 56/001
11,967,033 B1* 4/2024 Pisoni .............. G06V 30/19173
12,461,925 B2* 11/2025 Chin ................... G06F 16/9535
2002/0029146 A1* 3/2002 Nir ......................... G09B 19/04 704/260
2008/0181489 A1* 7/2008 Fu ......................... G10L 15/142 704/E15.028
2014/0365217 A1* 12/2014 Fume ...................... G10L 13/08 704/235
2015/0073770 A1* 3/2015 Pulz ...................... G10L 13/047 704/3
2016/0259778 A1* 9/2016 Cookson ............... G06F 40/284
2018/0182396 A1* 6/2018 An .......................... G10L 15/26
2020/0004831 A1* 1/2020 Burceanu .............. G06F 40/253
2020/0058319 A1* 2/2020 Satoh ..................... H04R 1/406
2020/0184958 A1* 6/2020 Norouzi ................. G09B 19/04
2020/0279561 A1* 9/2020 Sheeder .................. G06F 3/011
2021/0264895 A1* 8/2021 Fujimura ................ G10L 13/02
2021/0329338 A1* 10/2021 Khov ................ H04N 21/4665
2022/0036005 A1* 2/2022 de Brébisson .......... G10L 15/26
2022/0405409 A1* 12/2022 Cheng-Shorland ..... G06F 21/31
2023/0132418 A1* 5/2023 Ashikawa ............. G06F 40/268 704/9
2023/0334263 A1* 10/2023 Konam .................. G16H 10/20
(Continued)

FOREIGN PATENT DOCUMENTS

CN 117743567 A 3/2024
CN 118536502 A 8/2024
(Continued)

*Primary Examiner* — Anne L Thomas-Homescu
(74) *Attorney, Agent, or Firm* — CALDWELL LLC

(57) ABSTRACT

An apparatus for and method of machine-learning model configuration. The apparatus includes at least a processor, and a memory that contains instructions configuring the at least a processor to receive prework data, generate an outline including a plurality of outline segments using an outline model as a function of the prework data, and receive speech data in response to the generation of the outline. Additionally, the processor is configured to generate a manuscript as a function of the outline and the speech data, and generate a graphical user interface including the manuscript.

20 Claims, 10 Drawing Sheets

(56) References Cited

U.S. PATENT DOCUMENTS

| | | | | |
|---|---|---|---|---|
| 2023/0367973 | A1* | 11/2023 | Konam | G06F 40/134 |
| 2023/0420001 | A1* | 12/2023 | Washington | G06F 16/7867 |
| 2024/0073219 | A1* | 2/2024 | Maizels | G10L 13/00 |
| 2024/0212265 | A1* | 6/2024 | Agarwal | G10L 15/1815 |
| 2024/0212715 | A1* | 6/2024 | Yee | G06F 3/04842 |
| 2024/0395246 | A1* | 11/2024 | Mcquinn | G10L 13/02 |
| 2025/0086895 | A1* | 3/2025 | Chan | G06F 3/04842 |
| 2025/0118336 | A1* | 4/2025 | Di Gangi | G10L 13/10 |
| 2025/0218424 | A1* | 7/2025 | Byeon | G10L 15/18 |
| 2025/0245528 | A1* | 7/2025 | Webster | G06N 5/022 |
| 2025/0370828 | A1* | 12/2025 | King | G06F 9/54 |
| 2025/0390559 | A1* | 12/2025 | Drolet | G06F 21/106 |
| 2025/0391548 | A1* | 12/2025 | Mounzer | G16H 40/20 |

FOREIGN PATENT DOCUMENTS

| | | | | | |
|---|---|---|---|---|---|
| CN | 120337867 | A | | 7/2025 | |
| CN | 120850964 | A | * | 10/2025 | G06N 3/08 |

* cited by examiner

APPARATUS FOR AND METHOD OF MACHINE-LEARNING MODEL CONFIGURATION

FIELD OF THE INVENTION

The present invention generally relates to the field of artificial intelligence. In particular, the present invention is directed to an apparatus for and method of machine-learning model configuration.

BACKGROUND

Existing systems for configuring machine-learning models often rely on generic training data and static configuration approaches. Such systems may generate outputs that lack logical sequencing. Accordingly, there remains a need for improved systems that addresses the challenges.

SUMMARY OF THE DISCLOSURE

In some aspects, the techniques described herein relate to an apparatus for machine-learning model configuration, the apparatus including at least a processor, and a memory communicatively connected to the at least a processor, wherein the memory contains instructions configuring the at least a processor to receive prework data, generate an outline including a plurality of outline segments using an outline model as a function of the prework data, wherein generating the outline includes retrieving a corpus of documents as a function of a plurality of retrieval thresholds, extracting at least a document pattern from the corpus of documents, generating an outline instruction set for the outline model as a function the at least a document pattern, and configuring the outline model as a function of the outline instruction set, receive speech data in response to the generation of the outline, generate a manuscript as a function of the outline and the speech data, wherein generating the manuscript includes segmenting the speech data to be aligned to the plurality of outline segments, detecting a speech tone and at least a misarticulation element from the speech data, and synthesizing manuscript texts for each of the plurality of outline segments as a function of the segmented speech data, the speech tone and the at least a misarticulation element, and generate a graphical user interface including the manuscript.

In some aspects, the techniques described herein relate to a method for machine-learning model configuration, the method including receiving, using at least a processor, prework data, generating, using the at least a processor, an outline including a plurality of outline segments using an outline model as a function of the prework data, wherein generating the outline includes retrieving a corpus of documents as a function of a plurality of retrieval thresholds, extracting at least a document pattern from the corpus of documents, generating an outline instruction set for the outline model as a function the at least a document pattern, and configuring the outline model as a function of the outline instruction set, receiving, using the at least a processor, speech data in response to the generation of the outline, generating, using the at least a processor, a manuscript as a function of the outline and the speech data, wherein generating the manuscript includes segmenting the speech data to be aligned to the plurality of outline segments, detecting a speech tone and at least a misarticulation element from the speech data, and synthesizing manuscript texts for each of the plurality of outline segments as a function of the segmented speech data, the speech tone and the at least a misarticulation element, and generating, using the at least a processor, a graphical user interface including the manuscript.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
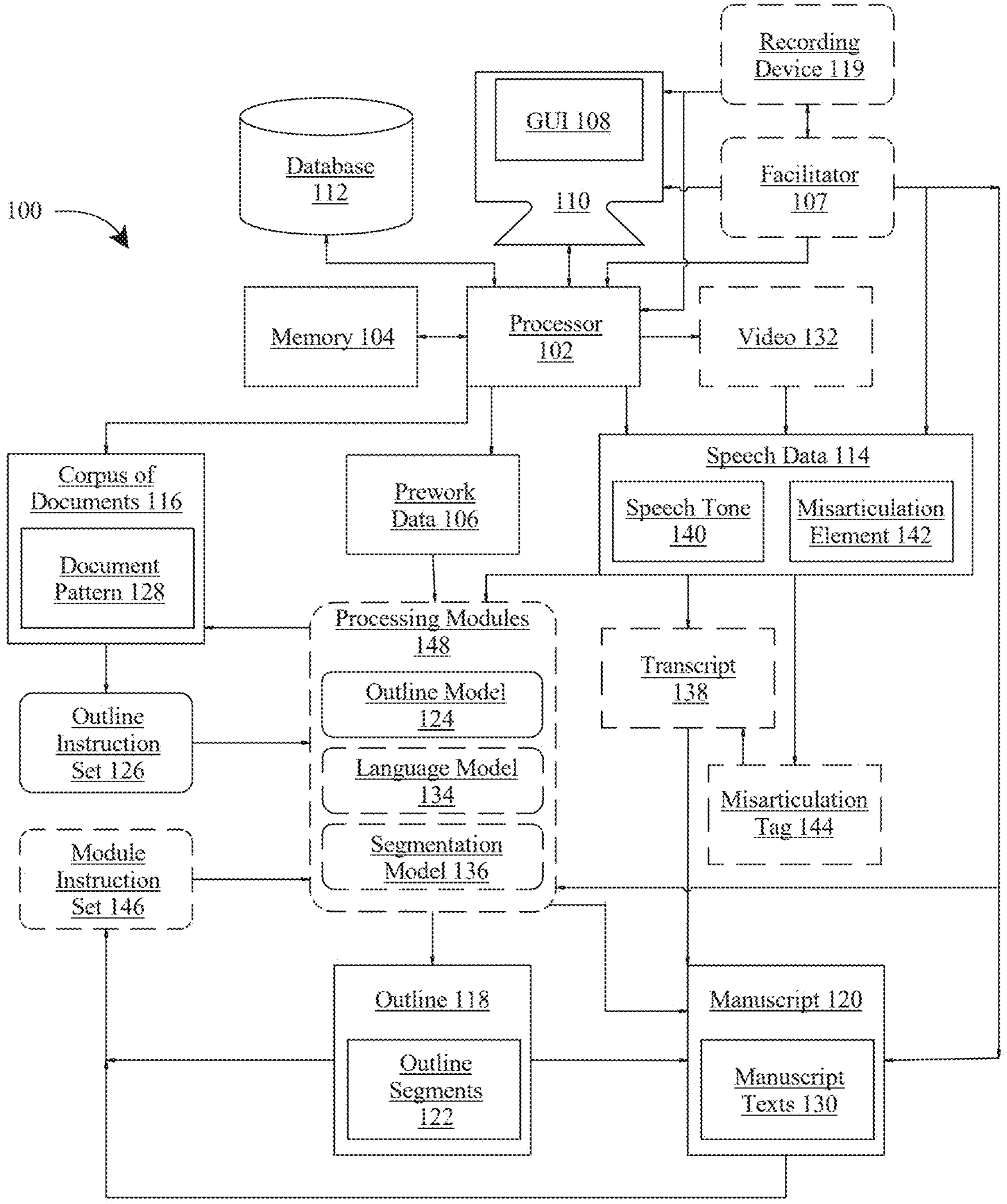
FIG. 1 illustrates a block diagram of an exemplary apparatus for machine-learning model configuration.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for machine-learning model configuration, the apparatus including at least a processor, and a memory communicatively connected to the at least a processor, wherein the memory contains instructions configuring the at least a processor to receive prework data, generate an outline including a plurality of outline segments using an outline model as a function of the prework data, wherein generating the outline includes retrieving a corpus of documents as a function of a plurality of retrieval thresholds, extracting at least a document pattern from the corpus of documents, generating an outline instruction set for the outline model as a function the at least a document pattern, and configuring the outline model as a function of the outline instruction set, receive speech data in response to the generation of the outline, generate a manuscript as a function of the outline and the speech data, wherein generating the manuscript includes segmenting the speech data to be aligned to the plurality of outline segments, detecting a speech tone and at least a misarticulation element from the speech data, and synthesizing manuscript texts for each of the plurality of outline segments as a function of the segmented speech data, the speech tone and the at least a misarticulation element, and generate a graphical user interface including the manuscript. Exemplary embodiments illustrating aspects of the present disclosure are described below in the context of several specific examples.

In one or more embodiments, the present disclosure relates to systems and methods for data segmentation and generative content synthesis. The disclosed system may provide an end-to-end workflow configured to generate a first draft of a manuscript and an accompanying manuscript score by sequentially performing a series of automated and semi-automated processing stages. In some embodiments, the system may include a pre-structuring intelligence stage that establishes a document's conceptual scope prior to content generation. This stage May ensure that subsequent generative operations are grounded in predefined document structures derived from curated exemplars and reinforced by author-supplied evidence or prework data. In one or more embodiments, the system may further include an outline synthesis stage that transforms prework data into an organized outline or set of chapter-level talking points. Each talking point may be associated with structural or thematic markers, such as impact-stack markers, which may denote the intended rhetorical or instructional purpose of each chapter. During this stage, the system may also generate a per-chapter or per-segment score that reflects preliminary quality or completeness metrics associated with the generated outline. In some embodiments, a speech-native capture stage may be performed in which an entity participates in a guided conversation or directed recording session. During this process, a director or automated interface may inject structural hashtags, such as "#hook," "#thesis," or "#takeaway", into the live transcript to facilitate later segmentation. The resulting transcripts may therefore be pre-labeled and pre-segmented for automated alignment with corresponding outline segments. In one or more embodiments, the system may perform a rate-controlled long-form generation stage that synthesizes extended manuscript sections based on the previously defined segmentation boundaries. This process may include one or more preparatory passes to normalize data and apply light pre-editing before text generation. To prevent computational overload and maintain stable model performance, long body sections may be subdivided into multiple parts, such as four evenly paced sections, and processed with controlled timing intervals or delay parameters. In some embodiments, an articulation assessment stage may be applied to evaluate the clarity and fluency of each generated or transcribed section. The system may classify each section as "articulate," "rambling," or "hybrid" based on factors such as filler frequency, sentence completeness, or prosodic smoothness. These classifications may be used to determine the aggressiveness of subsequent editing passes, allowing the system to improve coherence while preserving the author's original voice and stylistic rhythm. In one or more embodiments, an orchestration and compilation stage may be used to consolidate intermediate results generated throughout the workflow. This orchestration process may manage state data, apply quality guardrails, and coordinate interactions among multiple processing modules. Upon completion, the system may compile all generated and edited sections into a unified manuscript and may produce a visible first-draft benchmark or quality score that quantifies manuscript performance relative to defined evaluation metrics.

In one or more embodiments, the disclosure further relates to a trained intelligence layer for structured content generation. This layer may be configured to construct a knowledge base derived from a curated corpus of tables of contents (TOCs) collected from best-selling nonfiction books. The system may analyze these exemplars to identify recurring structural patterns and rules, referred to herein as document patterns, which may then be encoded as generative rules for downstream use by the outline model or other machine-learning components. In some embodiments, the corpus assembly process may be performed using an AI-assisted retrieval mechanism or web crawler configured to collect TOCs from published titles that satisfy one or more quality thresholds, such as a minimum average rating (e.g., greater than 4.5 stars), a minimum number of reviews (e.g., at least 100), or verified best-seller status. The structural practices extracted from this curated corpus may then be encoded into a table-of-contents knowledge base or generation rule set used to guide future outline synthesis operations. In one or more embodiments, the trained intelligence layer may further standardize model instruction sets via a meta-generator component that converts observed document patterns into reusable and generalizable configuration rules. The system may also leverage additional contextual databases, such as a multi-perspective Story Vault, which may contain categorized narrative units or story exemplars sourced from authors, clients, or cultural references. These narrative units may be used to seed the outline model with high-leverage storytelling components, enabling generation of outlines and manuscripts that integrate persuasive, instructive, or experiential elements in a coherent and structured manner.

Referring now to FIG. 1, an exemplary embodiment of apparatus 100 for machine-learning model configuration is illustrated. Apparatus 100 may include circuitry such as without limitation a processor 102 communicatively connected to a memory 104; for instance, circuitry may include and/or be included in a computing device. Processor 102 may include any computing device as described in this disclosure, including without limitation a microcontroller, microprocessor, digital signal processor (DSP) and/or system on a chip (SoC) as described in this disclosure. Processor 102 may include, be included in, and/or communicate with a mobile device such as a mobile telephone or smartphone. Processor 102 may include a single computing device operating independently, or may include two or more computing device operating in concert, in parallel, sequentially or the like; two or more computing devices may be included together in a single computing device or in two or more computing devices. Processor 102 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Processor 102 may include one or more computing devices dedicated to data storage, security, distribution of traffic for load balancing, and the like. Processor 102 may distribute one or more computing tasks as described below across a plurality of computing devices of computing device, which may operate in parallel, in series, redundantly, or in any other manner used for distribution of tasks or memory between computing devices. Processor 102 may be implemented, as a non-limiting example, using a "shared nothing" architecture.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor may access the information from primary memory.

With continued reference to FIG. 1, as used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, circuitry may alternatively or additionally be implemented by configuring a hardware device such as a combinatorial or sequential logic circuit, an application-specific integrated circuit (ASIC), a field-programmable gate array (FPGA), or other hardware unit; memory may be attached thereto to further configure the hardware unit using read-only memory (ROM) or any other static or writable memory as described in this disclosure. Alternatively or additionally, hardware units and/or modules may be combined with and/or in communication with a processor, such as without limitation in a system-on-chip architecture wherein some functions are configured by modification or design of hardware circuitry, such as without limitation FPGA circuitry, while others are configured in the form of instructions in memory for one or more processors. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, memory 104 contains instructions configuring processor 102 to receive prework data 106. For the purposes of this disclosure, "prework data" is input information that defines scope, objectives, and contextual boundaries for a proposed book. As a non-limiting example, prework data 106 may include categorical descriptors identifying a target audience, a market positioning statement, and an authorial objective such as enhancing brand recognition or supporting a business initiative. As a non-limiting example, prework data 106 may include metadata specifying a working title, a subject-matter domain, and a set of keywords to guide alignment of the outline with the intended theme. In some embodiments, prework data 106 may include a book blueprint that encodes a high-level organizational framework including a provisional table of contents, chapter titles, and anticipated narrative flow. In some embodiments, prework data 106 may include business-oriented attributes such as revenue projections linked to anticipated book distribution, or competitive analysis information derived from comparable works. For example, and without limitation, prework data 106 may specify that the proposed book is targeted toward mid-career professionals seeking advancement in sustainable energy, that the book should reinforce the author's expertise as a category-of-one thought leader, and that each chapter should conclude with a case study derived from client engagements.

With continued reference to FIG. 1, in some cases, processor 102 may receive prework data 106 from an entity and/or facilitator 107 through a graphical user interface 108 hosted on a remote device 110 communicatively connected to apparatus 100 over a network. The graphical user interface 108 is described in detail below. In such embodiments, an entity may provide responses to structured prompts presented within the graphical user interface 108, wherein the prompts request information including target readership, subject-matter scope, and desired outcomes of the proposed manuscript. In some embodiments, processor 102 may alternatively receive prework data 106 from a stored template document uploaded by the entity, the template document including fields specifying title, thematic focus, chapter placeholders, and narrative markers. As a non-limiting example, remote device 110 may include a laptop, desktop, tablet, mobile phone, smart phone, smart watch, kiosk, screen, smart headset, or things of the like. In some cases, remote device 110 may include an entity device. For the purposes of this disclosure, a "remote device" is any device external to the processor an entity or facilitator uses to input data. For the purposes of this disclosure, an "entity" is an individual, team, or organization that seeks to create a manuscript or other authored content. In one or more embodiments, the entity may include an author seeking to generate a first draft of a manuscript, a co-authoring group, or the like. The entity may engage with the system directly through graphical user interface 108 or indirectly through a facilitator 107. For the purposes of this disclosure, a "facilitator" is a human or machine-assisted participant that aids the entity in the creation, capture, or structuring of the manuscript. In some embodiments, the facilitator 107 may include a book director who interacts with the entity through conversational prompts to elicit structured narrative content corresponding to outline segments 122. In some embodiments, the facilitator 107 may include an automated conversational assistant or chatbot module configured to present predefined or dynamically generated questions to guide the entity through the content creation process. In some embodiments, the facilitator 107 may include a combination of a human director and an AI-driven prompting system, wherein the human director introduces contextual cues and the AI module records, analyzes, and stores the responses as part of prework data 106. In some embodiments, remote device 110 may include an interface configured to receive inputs from an entity. For the purposes of this disclosure, a "user" is any individuals that use the apparatus 100. As a non-limiting example, user may include entity, facilitator 107, and the like. In some embodiments, a user may manually input any data into apparatus 100 using remote device 110. In some embodiments, entity and/or facilitator 107 may have a capability to process, store or transmit any information independently.

With continued reference to FIG. 1, in some embodiments, processor 102 may receive prework data 106 as a data file transmitted from a remote storage service, such as a cloud-based repository associated with the entity. In some cases, prework data 106 may be received in multiple stages, wherein an initial portion of the prework data 106 may include a high-level book blueprint, and subsequent portions provide refinements such as chapter-specific objectives, examples, and reference materials. For example, and without limitation, processor 102 may receive prework data 106 including a spreadsheet populated with chapter titles, a text file describing market positioning goals, and an audio note in which the entity verbally describes the desired tone and style of the manuscript.

With continued reference to FIG. 1, in some embodiments, processor 102 may receive prework data 106 from a database 112. As used in this disclosure, a "database" is a data structure configured to store data associated with a subject. As a non-limiting example, database 112 may store prework data 106, speech data 114, corpus of documents 116, outline 118, manuscript 120, and the like. In one or more embodiments, database 112 may include inputted or calculated information and datum related to book writing. In some embodiments, a datum history may be stored in database 112. As a non-limiting example, the datum history may include real-time and/or previous inputted data related to book writing. As a non-limiting example, database 112 may include instructions from a user, who may be an expert user, a past user in embodiments disclosed herein, or the like, where the instructions may include examples of the data related to book writing.

With continued reference to FIG. 1, in some embodiments, processor 102 may be communicatively connected with database 112. For example, and without limitation, in some cases, database 112 may be local to processor 102. In another example, and without limitation, database 112 may be remote to processor 102 and communicative with processor 102 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 102 connects directly, dynamically, and non-hierarchically to as many other computing devices as possible. A "network topology" as used in this disclosure is an arrangement of elements of a communication network.

With continued reference to FIG. 1, in some embodiments, database 112 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some embodiments, prework data 106 may be derived from a chatbot system. The chatbot system is further described below. For the purposes of this disclosure, "chatbot" is an artificial intelligence (AI) program designed to simulate human conversation or interaction through text, voice-based or image-based communication. In some embodiments, the chatbot may be configured to prompt an entity with structured queries related to the scope, objectives, and narrative intent of a proposed manuscript. The chatbot may process responses in natural language form, extract semantic features, and transform the responses into structured prework data 106 suitable for use by processor 102. In some cases, the chatbot may operate as a guided interview tool, wherein an entity interacts with the chatbot to articulate business goals, define a bullseye reader profile, or provide examples of key themes to be addressed in the manuscript. In some embodiments, the chatbot may integrate with a knowledge base including exemplar book blueprints and tables of contents, thereby suggesting refinements or additions to the entity's responses. For example, and without limitation, the chatbot may query the entity regarding target outcomes such as increasing client acquisition or establishing thought-leadership credibility and may convert those responses into structured data fields that are transmitted as prework data 106 to apparatus 100. In other embodiments, the chatbot may accept multimodal inputs, including audio or video recordings, and may transcribe and normalize such recordings prior to producing prework data 106. In this manner, the chatbot functions as an intelligent front-end system that standardizes, validates, and enriches author input before the data is processed for outline generation.

With continued reference to FIG. 1, memory 104 contains instructions configuring processor 102 to generate an outline 118 including a plurality of outline segments 122 using an outline model 124 as a function of prework data 106. For the purposes of this disclosure, an "outline" is a structured representation of a book. In some cases, outline 118 may encode organizational hierarchy, thematic flow, and narrative scope. In some embodiments, outline 118 may include a table of contents specifying outline segments 122, chapters, subchapters, and thematic divisions. In other embodiments, outline 118 may include a collection of chapter-level talking points annotated with narrative markers or chapters (outline segments 122) such as "hook," "thesis," "body," and "takeaway." For the purposes of this disclosure, an "outline segment" is a subdivision of the outline corresponding to a discrete structural or thematic unit within the manuscript. Outline segments 122 may align to chapters, sections within chapters, or narrative markers used to guide the drafting process. As a non-limiting example, an outline segment 122 may represent a "hook" paragraph designed to capture reader attention, a "thesis" paragraph presenting the central argument of the chapter, a "body" section elaborating supporting details, or a "takeaway" conclusion highlighting actionable insights. In other embodiments, outline segments 122 may correspond to user-specified themes such as a personal anecdote, a client story, or a cultural reference, which are later mapped to the story vault during manuscript generation. In some embodiments, processor 102 may generate outline 118 by applying the outline instruction set to the outline model 124, wherein the outline instruction set encodes structural rules derived from the corpus of documents 116. In this manner, outline 118 provides a framework that constrains manuscript generation to conform with both author-supplied prework data 106 and validated structural practices observed in exemplar works.

With continued reference to FIG. 1, for the purposes of this disclosure, an "outline model" is a machine-learning model or rule-based generative model configured to produce an outline. Outline model 124 may be trained, fine-tuned, or configured using an outline instruction set 126 derived from structural patterns identified in a corpus of documents 116 as described in detail below. In some embodiments, outline model 124 may include a transformer-based natural language processing model adapted to generate hierarchical text structures. In other embodiments, outline model 124 may include a rules-based generative system seeded with patterns extracted from nonfiction exemplars, wherein the rules specify chapter ordering, distribution of themes, or frequency of narrative devices. In still other embodiments, outline model 124 may include a hybrid model wherein a statistical language model proposes outline candidates that are constrained by encoded rules derived from best-selling tables of contents. As a non-limiting example, outline model 124 may be configured to generate a twelve-chapter sequence for a nonfiction book, wherein each chapter includes subsections labeled "hook," "thesis," "body," and "takeaway." As another example, outline model 124 may generate a high-level three-part framework with each part subdivided into multiple chapters according to structural practices extracted from the corpus of documents 116. In some embodiments, outline model 124 may incorporate contextual metadata from prework data 106, such as an entity's business objectives or bullseye reader profile, to ensure that the generated outline aligns with both user-defined goals and validated structural conventions. In some embodiments, the outline model 124 may be trained on input data comprising structured representations of tables of contents, chapter headings, subheadings, and related metadata extracted from a corpus of documents 116. The output data for training may include annotated outline structures or rule-based instruction sets that describe chapter hierarchy, sequencing, and rhetorical function. The corpus of documents 116 used to train the outline model 124 may include best-selling nonfiction books, instructional texts, or similar works that meet predefined retrieval thresholds, such as a minimum number of reader reviews, a minimum average rating, or a best-seller designation. For example, and without limitation, the training corpus may include tables of contents from nonfiction works with more than 1,000 verified reviews and an average rating above 4.2 stars. During training, each table of contents may be parsed into a hierarchical graph representing structural relationships between parent and child chapters, and these representations may serve as both input and label data for supervised or semi-supervised learning.

With continued reference to FIG. 1, in some embodiments, processor 102 may generate outline 118 by parsing prework data 106 into machine-readable features. Processor 102 may tokenize textual elements of prework data 106 using a subword tokenizer to produce a sequence of tokens, extract semantic embeddings using a language representation model, and normalize categorical inputs such as target audience descriptors or thematic keywords into vector representations. In some cases, processor 102 may further extract metadata from prework data 106, including numerical attributes such as anticipated chapter count, desired word length, or priority weightings for specific topics. Processor 102 may then apply these extracted features to outline model 124, which has been configured using an outline instruction set 126 derived from corpus of documents 116. The outline instruction set 126 may include encoded rules specifying ordering constraints, hierarchical depth of sections, and distribution of narrative markers. During inference, processor 102 may supply prework feature vectors as conditioning input to outline model 124, wherein the outline model 124 may generate candidate structures ranked according to their conformity with outline instruction set 126. In some embodiments, processor 102 may generate outline segments 122 by subdividing each candidate outline into discrete structural units. Processor 102 may apply a segmentation routine that assigns narrative markers such as "hook," "thesis," "body," and "takeaway" to subsections of each chapter. This may be accomplished by mapping prework data 106 descriptors to specific markers, such that keywords reflecting problem statements are aligned to "hook," explanatory sequences are aligned to "thesis," supporting evidence is aligned to "body," and prescriptive statements are aligned to "takeaway." In other embodiments, processor 102 may score multiple outline candidates using a quality function. The quality function may compute alignment between outline segments 122 and prework data 106 using cosine similarity between semantic embeddings, adherence to structural rules, and compliance with entity-specified objectives. Processor 102 may select the highest-scoring candidate and output it as outline 118, with each chapter or section represented as outline segments 122. For example, and without limitation, if prework data 106 specifies that the manuscript should contain twelve chapters focused on sustainable leadership for mid-career professionals, processor 102 may generate outline 118 including twelve chapter headings with corresponding outline segments 122 labeled "hook," "thesis," "body," and "takeaway." Processor 102 may ensure that the chapters align with business-oriented goals encoded in prework data 106, such as positioning the author as a thought leader and providing actionable strategies for organizational transformation.

With continued reference to FIG. 1, generating outline 118 includes retrieving a corpus of documents 116 as a function of a plurality of retrieval thresholds. For the purposes of this disclosure, a "corpus of documents" is a collection of textual artifacts retrieved from one or more sources and used as input for extracting structural patterns that inform outline generation. Corpus of documents 116 may include tables of contents, chapter headings, metadata, or other organizational features derived from published works. In some embodiments, corpus of documents 116 may further include auxiliary descriptors such as sales data, review scores, or categorization labels associated with each work. As a non-limiting example, corpus of documents 116 may include one hundred tables of contents from nonfiction books rated above four stars on a digital marketplace, wherein each table of contents is retrieved as a structured document containing chapter numbers, titles, and section hierarchies. In another example, corpus of documents 116 may include a plurality of high-selling business books exceeding one thousand verified reviews, from which structural practices such as recurring chapter archetypes or distribution of case studies are extracted. In some cases, user may manually input corpus of documents 116. In some cases, corpus of documents 116 may be retrieved from a database 112. As a non-limiting example, processor 102 may use corpus of documents 116 that is previously used in previous iterations.

With continued reference to FIG. 1, for the purposes of this disclosure, a "retrieval threshold" is a predefined criterion used to filter candidate documents during assembly of corpus of documents 116. Retrieval threshold may define minimum or maximum values for numerical, categorical, or qualitative attributes of the candidate documents. In some embodiments, retrieval threshold may specify a minimum review rating, a minimum number of reviews, or a designation as a best seller within a category. In other embodiments, retrieval threshold may define temporal limits, such as publication within the last five years, or thematic limits, such as classification within a specific subject domain. For example, and without limitation, retrieval threshold may include a condition that candidate documents must have an average rating of at least 4.2 stars and a review count of at least 1,000. In another example, retrieval threshold may specify that only best-selling nonfiction works appearing within the top 1,000 titles of a digital marketplace are eligible for inclusion in corpus of documents 116. By enforcing retrieval thresholds, processor 102 ensures that corpus of documents 116 reflects high-quality, high-relevance exemplars from which structural patterns may be reliably derived. In some cases, user may manually input retrieval threshold. In some cases, retrieval threshold may be retrieved from a database 112. As a non-limiting example, processor 102 may use retrieval threshold that is previously used in previous iterations.

With continued reference to FIG. 1, in some embodiments, a corpus of documents 116 may be derived from a web crawler configured to identify source materials relevant to the generation of an outline 118. For the purposes of this disclosure, a "web crawler" is a software process that systematically navigates network-accessible resources to retrieve and index content based on predefined criteria. In some embodiments, processor 102 may instantiate a web crawler seeded with platform URLs, wherein the web crawler may then traverse related URLs, retrieve content, and extract candidate documents that satisfy at least one retrieval threshold such as minimum review rating, number of ratings, or designation as a best seller. In some embodiments, processor 102 may configure the web crawler to access digital platforms containing published works, such as online bookstores, review aggregators, or author repositories, to assemble the corpus of documents 116. The web crawler may be further guided by a structured query generated from entity input, wherein the structured query may include keywords, target domains, or author-specified competitor titles. In some embodiments, the web crawler may be configured to extract structural data patterns from retrieved content, such as recurring organizational features in tables of contents, chapter titles, or narrative markers. For the purposes of this disclosure, a "data pattern" is a recurring structural or linguistic feature identifiable across multiple documents. The web crawler may compute a relevancy score for each identified data pattern, wherein the relevancy score is generated automatically by processor 102, received from a machine-learning model, or adjusted according to entity input. The relevancy score may be represented as a numerical value corresponding to the strength of association between the retrieved content and the desired scope of the proposed manuscript. For example, and without limitation, a web crawler may be configured to search for nonfiction business books rated above four stars with more than one thousand reviews, extract their tables of contents, identify repeated structural practices such as a problem-solution-impact sequence, and encode those practices into corpus of documents 116 for downstream use by outline model 124.

With continued reference to FIG. 1, generating outline 118 includes extracting at least a document pattern 128 from a corpus of documents 116. For the purposes of this disclosure, a "document pattern" is a recurring structural, organizational, or linguistic feature identifiable across a corpus of documents. In some cases, document pattern 128 may represent hierarchical relationships, ordering of thematic units, frequency of specific narrative devices, or distribution of sections across a corpus of documents 116. In some cases, document pattern 128 may be derived by applying statistical analysis, rule-mining, or machine-learning techniques to corpus of documents 116. As a non-limiting example, document pattern 128 may include a recurring problem-solution-impact sequence identified in a plurality of nonfiction books. In another example, document pattern 128 may correspond to a consistent arrangement of chapters, such as a twelve-chapter structure wherein the first chapter introduces a motivational anecdote, middle chapters alternate between case studies and frameworks, and concluding chapters contain a call-to-action. In some embodiments, document pattern 128 may further include stylistic markers such as prevalence of rhetorical questions in introductions, or structural markers such as inclusion of summary sections at the end of each chapter. In some embodiments, processor 102 may detect document pattern 128 by aligning tables of contents across corpus of documents 116, extracting common chapter archetypes, and representing the pattern as a rule set or template. For example, processor 102 may determine that a majority of documents in corpus of documents 116 begin with a framing narrative, proceed with three to five thematic sections, and conclude with a forward-looking projection. This sequence may then be encoded as document pattern 128 for use in generating outline 118.

With continued reference to FIG. 1, in some embodiments, processor 102 may extract at least a document pattern 128 from corpus of documents 116 by executing a multi-stage structural mining pipeline that converts heterogeneous source documents into normalized sequence representations and derives recurrent organizational regularities from those sequences. Processor 102 may first parse each document to identify structural headers and subheaders using rule-based and machine-learning detectors that operate on typography cues, lexical markers, and HTML or PDF tag hierarchies. The parsed structures may be normalized into a canonical schema including hierarchical nodes representing chapters, sections, and subsections, each node annotated with features including title text, ordinal position, depth, and semantic tags inferred from title embeddings. In some embodiments, processor 102 may compute semantic embeddings for each node title using a sentence-level encoder and may assign a canonical archetype label to each node by nearest-neighbor mapping in an archetype vector space trained on known nonfiction structures. Processor 102 may further perform topic inference on node titles and available summaries using probabilistic topic models or transformer-based classifiers to assign thematic labels such as framework, case study, method, story, or summary. The result is a sequence S_d for each document d composed of archetype-labeled units with associated metadata, where each unit encodes its relative position, depth, and semantic class. In some embodiments, processor 102 may mine frequent sequential patterns across the set {S_d} using algorithms for sequential pattern discovery with time or position constraints. Processor 102 may apply frequent episode mining to discover subsequences that occur above a minimum support threshold across documents, optionally constrained by allowed gaps and depth transitions to preserve hierarchical fidelity. Processor 102 may also compute n-gram statistics over archetype sequences and evaluate significance using information-theoretic criteria such as pointwise mutual information to identify non-random co-occurrences of structural units. Where hierarchical relationships are salient, processor 102 may induce a probabilistic context-free grammar by maximizing likelihood of the observed trees under a grammar that favors sparse rule sets, thereby yielding reusable production rules that constitute document pattern 128. In other embodiments, processor 102 may frame pattern extraction as an alignment problem. Processor 102 may align sequences S_d pairwise using dynamic time warping with constraints that limit warping to near-diagonal bands, thereby tolerating small positional deviations while preserving global order. The alignments may be aggregated into a consensus path indicating prototypical ordering of archetypes, from which processor 102 may derive a canonical pattern with confidence intervals for the expected positions of key units such as introductions, problem statements, frameworks, evidence compilations, and conclusions. Processor 102 may subsequently refine this canonical pattern by clustering documents into subfamilies using hierarchical agglomerative clustering on sequence kernels, producing multiple document pattern 128 variants tailored to distinct subgenres. In some embodiments, processor 102 may incorporate quality-aware weighting derived from retrieval thresholds. Each document's contribution to support counts or likelihood estimates may be weighted by a quality weight computed from its review rating, number of ratings, sales rank, recency, or subject relevance. Processor 102 may then select document pattern 128 as the set of rules or templates that optimize an objective function combining pattern support, compactness, and predictive fit. Compactness may be measured by minimum description length, while predictive fit may be measured by the pattern's ability to explain held-out documents' structures under cross-validation. In some embodiments, processor 102 may represent document pattern 128 as a rule set expressed in a constrained schema. The rule set may include ordering constraints such as "Introduction precedes Framework," cardinality constraints such as "at least three Body units between Thesis and Takeaway," and depth constraints such as "Case Study is a child of Body." Each rule may carry a weight reflecting empirical prevalence and a variance parameter indicating tolerated positional dispersion. Processor 102 may serialize this rule set as outline instruction set inputs for outline model 124, enabling downstream outline generation that conforms to patterns inferred from corpus of documents 116. For example, and without limitation, processor 102 may determine from one hundred best-selling business books that the most frequent high-level sequence is Introduction, Problem, Framework, Case Studies, Implementation, Conclusion, with an average of four Body subsections per Framework chapter and 80% prevalence of end-of-chapter summaries. Processor 102 may encode this as document pattern 128 with associated weights and positional tolerances, thereby providing a reproducible structural template that guides outline model 124 when generating outline 118 and outline segments 122 from prework data 106.

With continued reference to FIG. 1, generating outline 118 includes generating an outline instruction set 126 for an outline model 124 as a function at least a document pattern 128. For the purposes of this disclosure, an "outline instruction set" is a collection of encoded rules, parameters, or templates that constrain or guide the behavior of an outline model. In some cases, outline instruction set 126 may provide formalized directives that ensure outline model 124 generates outline 118 and outline segments 122 in conformity with validated organizational structures while still accommodating entity-supplied prework data 106. In some embodiments, outline instruction set 126 may include ordering rules, such as requiring an introduction to precede a problem statement, or requiring a conclusion to follow a set of implementation chapters. In other embodiments, outline instruction set 126 may include cardinality rules specifying a minimum or maximum number of outline segments within a chapter, such as requiring at least three case studies to appear between a thesis section and a takeaway section. Outline instruction set 126 may further include thematic alignment rules that map certain keywords or semantic classes from prework data 106 to designated outline segments 122, such as assigning anecdotal stories to "hook" sections and prescriptive methods to "takeaway" sections. As a non-limiting example, outline instruction set 126 may specify that an outline 118 should contain twelve chapters (outline segments 122), that the first chapter must include a "hook" followed by a "thesis," that each subsequent chapter must include at least one "body" segment, and that each chapter must end with a "takeaway." In another example, outline instruction set 126 may encode a higher-level sequence derived from corpus of documents 116, such as Problem, Framework, Case Studies, Implementation, Conclusion and apply this sequence as a structural skeleton for outline model 124. In some embodiments, outline instruction set 126 may include weighting parameters that adjust the probability of certain structures appearing in the generated outline 118. For example, a rule may specify that 80% of chapters should include a summary subsection, while allowing outline model 124 to omit the summary subsection in remaining chapters. In other embodiments, outline instruction set 126 may be represented as a context-free grammar or a probabilistic rule set, enabling outline model 124 to generate multiple candidate outlines while enforcing structural validity. By encoding organizational practices as outline instruction set 126, processor 102 ensures that outline model 124 generates outline 118 that integrates entity-supplied prework data 106 with empirically validated patterns, thereby reducing error rates and increasing the likelihood that the generated manuscript aligns with both authorial intent and reader expectations.

With continued reference to FIG. 1, in some embodiments, processor 102 may generate outline instruction set 126 as a programmatic transformation of document pattern 128 into a machine-interpretable rule specification that constrains or guides outline model 124. Processor 102 may first normalize document pattern 128 into a canonical intermediate representation that encodes ordering relations, hierarchical depth constraints, and cardinality ranges between structural units. The intermediate representation may include directed acyclic graphs whose nodes correspond to archetypal sections and whose edges encode permitted predecessor-successor relations with associated positional tolerances. Processor 102 may estimate parameters for each relation, including minimum and maximum repetition counts, expected relative positions, and variance terms derived from observed dispersion in corpus of documents 116, and may attach confidence weights computed from pattern support and quality-aware weights tied to retrieval thresholds. The result is a parameterized structural specification that captures both the mandatory skeleton and optional variability observed across exemplars. In some embodiments, processor 102 may compile the intermediate representation into outline instruction set 126 expressed in a formal schema consumable by outline model 124. The schema may be a probabilistic context-free grammar with production rules that generate chapters and outline segments, where each rule is assigned a probability proportional to its empirical prevalence and regularized by a compactness prior such as minimum description length. Alternatively, the schema may be a finite-state machine that emits sequences of labeled segments subject to transition constraints, or a constraint-satisfaction matrix that encodes hard constraints for ordering and soft constraints for thematic alignment with penalty weights. Processor 102 may further include parameter blocks defining cardinality limits for repeated units, depth policies for subsection nesting, and coverage goals for thematic classes, thereby enabling outline model 124 to produce hierarchical outputs that satisfy both global and local structure.

With continued reference to FIG. 1, in some embodiments, processor 102 may augment outline instruction set 126 with mapping functions that connect prework data 106 to specific structural slots. These mapping functions may be learned classifiers or rule-based matchers that project semantic embeddings of prework topics into target segment types such as "hook," "thesis," "body," or "takeaway." Processor 102 may encode these functions as alignment directives that bias slot filling during outline generation, for example by assigning higher prior weights to placing problem statements in early-chapter hooks or prescribing that client anecdotes populate body subsegments designated as case studies. Where outline model 124 is transformer-based, processor 102 may serialize the instruction set as control tokens, section tags, and prompt templates that condition generation. Where outline model 124 is rules-based, processor 102 may directly interpret the instruction set as executable generation templates with parameterized placeholders. In some embodiments, processor 102 may validate outline instruction set 126 prior to deployment by simulating generation runs and computing conformance metrics on held-out documents. Conformance may be measured by tree-edit distance between generated skeletons and exemplar structures, by coverage of required archetypes, and by violation counts of hard constraints. Processor 102 may iteratively adjust rule probabilities, transition penalties, and cardinality bounds using gradient-free optimization or Bayesian updating until validation metrics exceed a threshold. Processor 102 may also incorporate calibration routines that rescale weights to prevent mode collapse, ensuring that outline model 124 retains diversity while remaining within permitted structural envelopes. Provenance metadata, including hashes of source patterns, version identifiers, and timestamped signatures, may be attached so that downstream components can reproduce or audit the instruction set.

With continued reference to FIG. 1, in some embodiments, processor 102 may emit outline instruction set 126 in a model-agnostic interchange format, such as a structured document including a grammar section, a constraints section, a thematics-alignment section, and a runtime-parameters section. The runtime-parameters section may include generation-time limits such as maximum chapter count, preferred distribution of section lengths, and priority weights for high-impact segments. For transformer-based outline model 124, processor 102 may additionally produce adapter vectors or low-rank update matrices that fine-tune the model to respect the encoded structure and may associate these with a compatibility manifest that maps rule identifiers to token-level control sequences. For rules-based outline model 124, processor 102 may compile the instruction set into bytecode-like templates that a deterministic generator executes to produce outline 118 and outline segments 122. For example, and without limitation, when document pattern 128 indicates a canonical sequence of Introduction, Problem, Framework, Case Studies, Implementation, Conclusion with a mean of four body subsegments per framework chapter and an 0.8 probability of end-of-chapter summaries, processor 102 may generate outline instruction set 126 as a probabilistic grammar whose productions require the introduction to precede the problem, constrain body subsegments to the range [3,5], and include a summary terminal with probability 0.8 per chapter. The instruction set may also include alignment directives that map prework data 106 keywords relating to "pain points" to hook segments and "method steps" to takeaway segments, together with control tokens that, when presented to outline model 124, induce the generation of outline 118 respecting these structural rules.

With continued reference to FIG. 1, generating outline 118 includes configuring outline model 124 as a function of outline instruction set 126. In some embodiments, processor 102 may configure outline model 124 as a function of outline instruction set 126 by transforming the instruction set into model-specific control parameters, embeddings, or rule constraints that condition the outline model's generative behavior. Outline instruction set 126 may include a collection of structural rules, probabilistic weights, and alignment directives that are translated by processor 102 into a configuration state for outline model 124. The configuration process ensures that when outline model 124 is executed, its outputs conform to the organizational practices embodied in the instruction set while remaining sensitive to entity-supplied prework data 106. In some embodiments, where outline model 124 includes a transformer-based natural language model, processor 102 may configure the model by injecting control tokens or prompt templates corresponding to structural directives from outline instruction set 126. For example, processor 102 may prepend control tokens representing "Introduction," "Problem," "Framework," or "Case Studies" to the model's input sequence, thereby constraining generated outputs to follow the prescribed order. Processor 102 may further adjust attention weights by modifying positional encodings or bias matrices so that the model prioritizes transitions consistent with ordering constraints encoded in outline instruction set 126. In other embodiments, processor 102 may configure outline model 124 using adapter modules or low-rank parameter updates. For example, and without limitation, outline instruction set 126 may be converted into adapter vectors representing high-level organizational constraints, which are then injected into intermediate layers of outline model 124 to bias its representations toward producing hierarchically valid sequences. In this manner, processor 102 enforces compliance with structural rules without retraining the base model, instead applying lightweight fine-tuning driven directly by the instruction set. In some embodiments, where outline model 124 is rules-based, processor 102 may configure the model by compiling outline instruction set 126 into executable templates. Each rule in the instruction set may be encoded as a finite-state transition, grammar production, or template directive that outline model 124 interprets during generation. Processor 102 may load these templates into the model's execution environment, thereby restricting permissible transitions between structural units and enforcing cardinality, ordering, or thematic alignment rules specified in outline instruction set 126. In still other embodiments, processor 102 may configure outline model 124 by attaching scoring functions derived from outline instruction set 126. These scoring functions may evaluate candidate outline segments produced by the model, penalizing deviations from the encoded rules and promoting adherence to required patterns. Processor 102 may implement this as a constrained decoding process in which beam search is guided by penalties and rewards defined by outline instruction set 126. For example, and without limitation, if outline instruction set 126 specifies that each chapter must begin with a "hook," followed by a "thesis," and must include between three and five "body" segments before a "takeaway," processor 102 may configure outline model 124 such that its decoding routine prunes candidate outputs violating this structure. In a transformer-based model, this may be achieved by inserting constraint-aware control tokens into the decoding context, while in a rules-based model this may be achieved by compiling hard constraints into the generation grammar. In both cases, the result is outline model 124 producing outline 118 and outline segments 122 that comply with both entity-specific prework data 106 and structural conventions extracted from corpus of documents 116.

With continued reference to FIG. 1, memory 104 contains instructions configuring processor 102 to receive speech data 114 in response to generation of outline 118. For the purposes of this disclosure, "speech data" is an audio-based data stream that encodes verbal expressions of an entity intended for transformation into manuscript content. In some cases, speech data 114 may include continuous or segmented recordings of natural language utterances, captured through a microphone, camera, or other recording device 119. In some cases, speech data 114 may further include metadata such as timestamps, speaker identifiers, and background noise profiles. In some embodiments, speech data 114 may be received in the form of a digital audio file such as WAV, MP3, or FLAC, recorded during a live interview session or self-directed dictation. In one or more embodiments, the entity (e.g., an author) may engage in a live conversational session with a book director (e.g., facilitator 107). The book director may function as a guided interviewer or facilitator 107 who prompts the author to elaborate on the themes or outline segments 122. During this recording phase, the author may be equipped with a microphone connected to a field recorder (e.g., recording device 119), rather than being directly connected to processor 102 or the system network. The field recorder may capture high-fidelity, lossless audio data with minimal latency, ensuring the preservation of tone, pacing, and articulation characteristics critical to later analysis. Each conversation between the author and the book director may be recorded as an individual session corresponding to a particular chapter or outline segment 122. This per-chapter segmentation at the recording stage may facilitate later alignment between recorded speech and the structural components of the manuscript, enabling processor 102 to efficiently segment, transcribe, and synthesize content in a chapter-specific manner. In some embodiments, the recorded sessions may be stored locally on the field recorder, uploaded manually by the book director or automatically to a network storage location, and then transmitted to processor 102 for subsequent processing. For the purposes of this disclosure, a "book director" is an individual or an automated facilitator configured to guide an entity through a structured recording session. In one or more embodiments, the book director may include a human operator who conducts an interview, directs conversational pacing, or prompts the author to elaborate on specific outline segments. In some embodiments, book director may include an artificial intelligence (AI) system or software module trained to emulate human interviewing techniques by generating dynamic prompts, injecting structural markers, or detecting transitions in discourse.

With continued reference to FIG. 1, in some embodiments, apparatus 100 may further include a recording device 119. As a non-limiting example, recording device 119 may include a field recorder. For the purposes of this disclosure, a "recording device" is any hardware or software component configured to capture, encode, and store an audio signal, a video signal, or a combination thereof. In one or more embodiments, the recording device 119 may include a portable digital audio recorder equipped with one or more microphones, analog-to-digital converters, and onboard storage media. The recording device 119 may store captured audio data locally as digital audio files such as WAV or FLAC formats and may subsequently transmit the files to processor 102 via wired or wireless communication interfaces, including USB, Bluetooth, or network-based synchronization. In other embodiments, the recording device 119 may be integrated with one or more sensors, such as ambient noise detectors or gain controllers, configured to dynamically adjust recording levels to maintain consistent signal-to-noise ratio throughout the session. In some embodiments, a facilitator 107 or book director may manually transmit digital audio files (e.g., speech data 114) from recording device 119 (e.g., field recorder) to processor 102.

With continued reference to FIG. 1, in some cases, speech data 114 may include conversational exchanges between the entity and a facilitator 107 (e.g., book director), where the facilitator 107 introduces prompts or injects markers such as "#hook" or "#thesis" into the discourse to align the narrative to outline segments 122. As a non-limiting example, speech data 114 may include a two-hour video session in which an author verbally expands upon each outline segment of a previously generated outline 118. In another example, speech data 114 may include audiovisual recordings captured in multiple shorter segments, each corresponding to a specific chapter or thematic unit identified in outline 118 and subsequently processed through the ASR module for transcription. In still another example, speech data 114 may be derived from live-streamed interviews in which processor 102 captures the stream, isolates the audio, performs spectral transformations, and decodes the resulting audio features into textual elements suitable for synthesis into manuscript texts 130.

With continued reference to FIG. 1, in some embodiments, speech data 114 may be received in the form of a video file, such as MP4, MOV, or AVI, wherein the video file includes both an audio stream and a visual component. The visual component may contain non-verbal cues, such as gestures or structural hashtags introduced by a director, while the audio stream encodes the author's spoken narrative. In some cases, processor 102 may extract speech data 114 from a video 132 using an automatic speech recognition (ASR) module. In such embodiments, extracting the speech data 114 may include isolating the audio stream from the video 132, extracting at least an audio feature from the audio stream using a spectral transformation such as a short-time Fourier transform or a mel-frequency cepstral coefficient (MFCC) transformation, and decoding the audio feature into a textual element. For the purposes of this disclosure, a "video" is a digital file or data stream comprising a sequence of visual frames, optionally synchronized with an audio stream, that encodes dynamic imagery over time. Video 132 may include file formats such as MP4, MOV, AVI, or MKV and may be recorded using cameras, smartphones, webcams, or other audiovisual capture devices. As a non-limiting example, video 132 may include a live interview session captured on a webcam, a pre-recorded lecture saved as an MP4 file, or a streamed audiovisual session archived in MOV format. For the purposes of this disclosure, an "audio stream" is the temporally ordered acoustic signal embedded within or associated with video 132, encoding variations in air pressure or electrical signals corresponding to spoken utterances and other sound events. The audio stream may be represented as a waveform sampled at a defined frequency (e.g., 16 kHz or 44.1 kHz) and may be embedded within a container format such as MP4 or multiplexed with video frames. For the purposes of this disclosure, an "audio feature" is a mathematical representation or descriptor extracted from the audio stream that captures perceptually or structurally relevant information about the underlying acoustic signal. Audio features may include time-domain descriptors such as zero-crossing rate, frequency-domain descriptors such as spectral centroid, or perceptually weighted descriptors such as mel-frequency cepstral coefficients (MFCCs). As a non-limiting example, audio features may capture phoneme-specific spectral shapes, temporal energy fluctuations, or prosodic intonation patterns used to support robust decoding into text. For the purposes of this disclosure, a "spectral transformation" is a computational operation that maps the audio stream from a time-domain representation into a spectral or time-frequency representation, enabling extraction of discriminative features. Spectral transformations may include, without limitation, short-time Fourier transform (STFT), mel-frequency analysis, wavelet transforms, or linear predictive coding. As a non-limiting example, STFT may be applied to divide the audio stream into overlapping windows, each converted into a spectrum of frequency bins, while MFCC analysis may transform spectra into coefficients aligned with human auditory perception. For the purposes of this disclosure, a "textual element" is a discrete unit of written representation generated by decoding audio features into linguistic symbols. Textual elements may include phonemes, graphemes, words, or higher-order syntactic units. As a non-limiting example, the utterance "this is my introduction" captured in audio stream form may be decoded through spectral transformations into MFCC features, mapped by an ASR model into phoneme sequences, and finally emitted as textual elements "this," "is," "my," and "introduction."

With continued reference to FIG. 1, in some cases, processor 102 may include audiovisual speech recognition (AVSR) processes to recognize speech data 114 and/or audio stream in video 132. For example, processor 102 may use video 132 to aid in recognition of an entity moving their lips to speak on video to process the audio content of video 132. AVSR may use video 132 to aid the overall translation of the audio verbal content of video 132. In some embodiments, AVSR may include techniques employing image processing capabilities in lip reading to aid speech recognition processes. In some cases, AVSR may be used to decode (i.e., recognize) indeterministic phonemes or help in forming a preponderance among probabilistic candidates. In some cases, AVSR may include an audio-based automatic speech recognition process and an image-based automatic speech recognition process. AVSR may combine results from both processes with feature fusion. Audio-based speech recognition process may analysis audio according to any method described herein, for instance using a Mel frequency cepstral coefficients (MFCCs) and/or log-Mel spectrogram derived from raw audio samples. Image-based speech recognition may perform feature recognition to yield an image vector. In some cases, feature recognition may include any feature recognition process described in this disclosure, for example a variant of a convolutional neural network. In some cases, AVSR employs both an audio datum and an image datum to recognize speech data 114 and/or audio stream. For instance, audio vector and image vector may each be concatenated and used to predict speech made by entity, who is 'on camera.'

With continued reference to FIG. 1, in some embodiments, processor 102 may obtain document using automatic speech recognition (ASR). As a non-limiting example, ASR may analyze a record of a call or radio communication to obtain call record or radio record. For the purposes of this disclosure, "automatic speech recognition" is a technology that converts spoken language into written text or machine-readable form. In some embodiments, ASR may operate on a video 132 or audio recording provided by an entity, wherein the audio stream is isolated and analyzed to produce a transcript aligned with speech data 114. In some cases, ASR may include techniques employing natural language processing to improve recognition accuracy, such as applying language models to resolve indeterministic phonemes or to assign the most probable lexical candidate among multiple possibilities. In some embodiments, ASR may include an audio-based recognition process, wherein features such as mel-frequency cepstral coefficients (MFCCs) and log-Mel spectrograms are derived from raw audio samples, and an image-based recognition process, wherein visual features from video 132 may be used to reinforce recognition of speech content through lip reading or gesture correlation. In some embodiments, processor 102 may employ a neural network-based ASR model, such as a recurrent neural network or a transformer-based acoustic model, to decode acoustic features into textual elements. Feature extraction may include convolutional neural network variants configured to detect phonetic or prosodic features across spectral domains. The textual elements produced by ASR may be used to generate transcripts aligned with outline segments 122, providing the raw material for synthesis of manuscript texts 130. As a non-limiting example, processor 102 may receive a two-hour video recording of an author responding to prompts corresponding to outline segments 122. The ASR module may isolate the audio stream, extract MFCC features from the recording, apply a spectral transformation, and decode the features into textual elements such as words, phrases, or sentences. The resulting transcript may then be aligned to outline 118 and used by processor 102 in the subsequent synthesis of manuscript 120.

Still referring to FIG. 1, in some embodiments, automatic speech recognition may require training (i.e., enrollment). In some cases, training an automatic speech recognition model may require an individual speaker to read text or isolated vocabulary. In some cases, a solicitation video may include an audio component having an audible verbal content, the contents of which are known a priori by processor 102. Processor 102 may then train an automatic speech recognition model according to training data which includes audible verbal content correlated to known content. In this way, processor 102 may analyze a person's specific voice and train an automatic speech recognition model to the person's speech, resulting in increased accuracy. Alternatively or additionally, in some cases, processor 102 may include an automatic speech recognition model that is speaker-independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from audio content, rather than what the speaker is saying. In some cases, processor 102 may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include subject. For example, subject may speak within solicitation video, but others may speak as well.

Still referring to FIG. 1, in some embodiments, an automatic speech recognition process may include one or all of acoustic modeling, language modeling, and statistically-based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments, HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (i.e., audible verbal content) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics, indeed, any data that can be turned into a linear representation can be analyzed with DTW. In some cases, DTW may be used by an automatic speech recognition process to cope with different speaking (i.e., audible verbal content) speeds. In some cases, DTW may allow processor 102 to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. Neural network may include any neural network, for example those disclosed with reference to FIGS. 3-5. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases. neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

With continued reference to FIG. 1, in some embodiments, processor 102 may receive speech data 114 in response to generation of outline 118 by initiating a capture session that aligns the entity's verbal input with structural markers defined in outline 118. Processor 102 may first transmit outline 118, including outline segments 122, to a client-facing graphical user interface. In some cases, graphical user interface 108 may display prompts corresponding to each outline segment 122, such as "Provide your introductory hook," "Explain your thesis," or "Share a supporting case study." When the entity responds verbally to each prompt, the client device may capture the utterance as an audio or audiovisual stream and transmit the data to processor 102 over a network connection. In some embodiments, processor 102 may receive speech data 114 as a continuous recording session partitioned into sub-sessions keyed to outline segments 122. Processor 102 may inject structural markers, such as timestamps or facilitator-inserted hashtags (e.g., "#hook," "#thesis"), into the data stream to preserve alignment between spoken content and outline 118. The resulting annotated stream is transmitted to processor 102, which stores the speech data 114 in association with corresponding outline segments 122. In other embodiments, processor 102 may receive speech data 114 asynchronously through batch uploads. The entity may record responses to outline segments 122 offline using a mobile device or digital recorder, wherein each recording is tagged with a chapter identifier or outline segment label. The recordings may then be uploaded to a cloud storage location monitored by processor 102. Processor 102 may poll the storage location at defined intervals, retrieve new files, and associate each file with the corresponding outline segment 122 based on embedded metadata such as filename, audio tag, or embedded timestamp.

With continued reference to FIG. 1, in some embodiments, processor 102 may further pre-process received speech data 114 prior to storage. Pre-processing may include format normalization (e.g., converting MP3 to WAV), noise suppression using spectral subtraction, and feature extraction to generate low-level descriptors such as mel-frequency cepstral coefficients (MFCCs). These descriptors may later facilitate automatic speech recognition and segmentation. Processor 102 may also generate metadata tags recording the length, file size, and quality score of each captured segment, which are stored in association with speech data 114 to support later manuscript synthesis. For example, and without limitation, when an author records a 90-minute remote session structured according to outline 118, processor 102 may receive the speech data 114 as a series of MP4 files. Each file may contain spoken content for one chapter, with director-inserted hashtags marking internal divisions such as "hook," "thesis," and "takeaway." Processor 102 may ingest these files, extract audio streams, and associate them with corresponding outline segments 122 so that the subsequent manuscript-generation pipeline operates with both structural context and aligned speech input.

With continued reference to FIG. 1, in some cases, receiving speech data 114 may include routing the speech data 114 as a function of a data size of the speech data 114. In some cases, routing the speech data 114 may include routing the speech data 114 including the data size less than a size threshold to a language model 134 configured to convert the speech data 114 into a transcript 138 and routing the speech data 114 including the data size greater than the size threshold to a segmentation model 136 configured to partition the speech data into smaller segments. For the purposes of this disclosure, "data size" is a quantitative measure of the amount of digital information contained within data. Data size may be measured in bytes, kilobytes, megabytes, or gigabytes, and may also be expressed as a function of time duration or sampling rate. As a non-limiting example, a one-hour WAV audio file sampled at 44.1 kHz may correspond to a data size of approximately 600 megabytes, whereas a compressed MP3 recording of the same session may correspond to a data size of less than 100 megabytes. For the purposes of this disclosure, a "size threshold" is a predetermined or dynamically adjusted limit used to determine whether data is small enough to be processed directly by a certain model or large enough to require preprocessing. Size threshold may be expressed as a fixed storage value (e.g., 99 megabytes), as a temporal duration (e.g., 30 minutes of continuous audio), or as a hybrid metric combining file size, duration, and sampling rate. As a non-limiting example, processor 102 may route speech data 114 smaller than 99 megabytes directly to a transcription process, while routing larger files to segmentation model 136 to avoid overload or memory bottlenecks.

With continued reference to FIG. 1, for the purposes of this disclosure, a "language model" is a machine-learning model trained to map acoustic or textual inputs into structured linguistic outputs. Language model 134 may include, without limitation, transformer-based architectures, recurrent neural networks, or hybrid acoustic-linguistic frameworks. In the context of this disclosure, language model 134 may be configured to receive audio-derived features or preprocessed speech frames and convert them into a transcript 138 comprising textual elements such as words, sentences, or chapter headings. As a non-limiting example, language model 134 may be an ASR-enabled transformer network that receives MFCC features and outputs aligned transcripts for each utterance of the entity. In one or more embodiments, the language model 134 may be trained on input data comprising aligned pairs of segmented speech data 114 and corresponding textual exemplars of edited, publication-ready prose. The outputs for training may include manuscript texts 130 synthesized to reflect both structural integrity and stylistic coherence with the input transcripts. The training data for the language model 134 may originate from multiple curated sources, including edited manuscripts generated through prior human editorial processes, transcripts of author interviews, story vault datasets containing first-, second-, and third-person narrative examples, and corpora of publicly available nonfiction works. In some cases, training data may also include artificial or augmented examples generated by the system itself, such as drafts scored and revised through iterative reinforcement based on manuscript scores. The inclusion of such training data may enable the language model 134 to learn mappings between raw transcribed speech and polished long-form text while preserving voice fidelity.

With continued reference to FIG. 1, for the purposes of this disclosure, a "segmentation model" is a computational model configured to partition speech data 114 into smaller, manageable units prior to transcription. Segmentation model 136 may operate on time windows, lexical tokens, prosodic boundaries, or metadata markers embedded in the recording. In some embodiments, segmentation model 136 may utilize a neural network trained on speech boundary detection to identify sentence-level or chapter-level breaks. As a non-limiting example, segmentation model 136 may partition a two-hour interview into twelve ten-minute segments aligned with outline segments 122, which are then individually routed to language model 134 for transcription. In some embodiments, the segmentation model 136 may be trained on input data comprising raw or partially transcribed speech data paired with manually or automatically annotated segmentation boundaries. The output for training may be boundary prediction labels or segmentation maps that indicate where one outline segment 122 or manuscript section logically ends and another begins. Training data for the segmentation model 136 may include conversational recordings, guided author interviews, and synthetic datasets where speech data are aligned with structural markers such as "#hook," "#body," "#takeaway," or "#conclusion." The source data for this model may also incorporate prosodic and acoustic features, such as pitch, energy, and pause duration, derived from spectral transformations (e.g., mel-frequency cepstral coefficients). In some cases, segmentation ground truth data may be created by combining linguistic cues (from the transcript) and prosodic cues (from the raw audio) to train multimodal boundary detection.

Still referring to FIG. 1, in one or more embodiments, any models described in this disclosure may optionally undergo continual fine-tuning using user-specific prework data 106 and newly generated manuscripts 120. This fine-tuning process may be supervised or reinforcement-based and may use as inputs the author's own outlines, transcripts, or manuscripts, and as outputs system-corrected drafts or scored versions thereof. Such adaptive retraining may improve personalization and ensure the models evolve to reflect both general linguistic quality and individual authorial characteristics. In some cases, data sources of any training data described herein may include, without limitation, publicly available datasets, proprietary publisher databases, manually curated archives of best-selling nonfiction works, and data supplied directly by users through graphical user interface 108. In some embodiments, all training data may be preprocessed to remove personally identifiable information (PII) and to comply with applicable data governance, licensing, and ethical-use standards.

Still referring to FIG. 1, in some cases, language model 134 may include a large language model (LLM). A "large language model," as used herein, is a deep learning data structure that can recognize, summarize, translate, predict and/or generate text and other content based on knowledge gained from massive datasets. In some embodiments, the outline model 124 or language model 134 used to generate manuscript 120 may be configured or fine-tuned using training sets derived from curated corpora of documents. For the purposes of this disclosure, a "training set" is a structured collection of digital text or data used to configure statistical parameters of a machine-learning model. Training sets may be drawn from diverse sources, including, as non-limiting examples, tables of contents from best-selling nonfiction books, outlines of published works, instructional manuals, academic articles, business documents, user communications, or other structured and semi-structured data. In some embodiments, training sets may include information collected from one or more public or private databases, provided that such data meets retrieval thresholds, such as a minimum popularity score, number of reviews, or quality rating. As a non-limiting example, processor 102 may assemble a training set of tables of contents from nonfiction books with at least 1,000 reviews and a rating above 4.2 stars, thereby ensuring that structural patterns are derived from high-quality exemplars. In some embodiments, training sets may further include entity-specific documents such as prework data 106 supplied by the author. Incorporating prework data 106 into training sets allows the outline model 124 or language model 134 to adapt general structural patterns into author-specific contexts, ensuring both fidelity to proven structures and preservation of the author's unique style or objectives. In certain cases, training sets may include pairs of input segments (e.g., transcripts aligned to outline segments 122) and corresponding desired outputs (e.g., polished manuscript texts 130), which may be used to refine generation tasks such as segmentation, articulation assessment, or voice preservation. An outline model 124 or language model 134 may be implemented using one or more machine learning architectures, depending on the capability requirements of the system. Exemplary architectures may include, without limitation, transformer-based models such as GPT (Generative Pretrained Transformer), BERT (Bidirectional Encoder Representations from Transformers), or T5 (Text-to-Text Transfer Transformer). In some embodiments, architecture selection may depend on whether the capability required is generative synthesis of manuscript texts 130, contextual alignment of segmented speech data 114 with outline segments 122, or rule-based adherence to document patterns 128 extracted from the corpus of documents 116.

With continued reference to FIG. 1, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction based algorithm configured to receive an article and apply a probability distribution to the words already typed in a sentence to work out the most likely word to come next in augmented articles. For example, if some words that have already been typed are "Nice to meet," then it may be highly likely that the word "you" will come next. An LLM may output such predictions by ranking words by likelihood or a prompt parameter. For the example given above, an LLM may score "you" as the most likely, "your" as the next most likely, "his" or "her" next, and the like. An LLM may include an encoder component and a decoder component.

Still referring to FIG. 1, LLM may include an attention mechanism, utilizing a transformer as described further below. An "attention mechanism," as used herein, is a part of a neural architecture that enables a system to dynamically highlight relevant features of the input data. In natural language processing this may be a sequence of textual elements. It may be applied directly to the raw input or to its higher-level representation. An attention mechanism may be an improvement to the limitation of the Encoder-Decoder model which encodes the input sequence to one fixed length vector from which to decode the output at each time step. This issue may be seen as a problem when decoding long sequences because it may make it difficult for the neural network to cope with long sentences, such as those that are longer than the sentences in the training corpus. Applying an attention mechanism, LLM may predict the next word by searching for a set of position in a source sentence where the most relevant information is concentrated. LLM may then predict the next word based on context vectors associated with these source positions and all the previous generated target words, such as textual data of a dictionary correlated to a prompt in a training data set. A "context vector," as used herein, are fixed-length vector representations useful for document retrieval and word sense disambiguation. In some embodiments, LLM may include encoder-decoder model incorporating an attention mechanism.

Still referring to FIG. 1, LLM may include a transformer architecture. In some embodiments, encoder component of LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, attention mechanism may include, without limitation, generalized attention self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input to other words. As a non-limiting example, an LLM may learn to associate the word "you," with "how" and "are." It is possible that an LLM learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referencing FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing to refer to FIG. 1, transformer architecture may include a decoder. Decoder may be a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

Still referring to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

Still referring to FIG. 1, decoder may take this output and add it to the decoder inputs. Decoder may continue decoding until a token is predicted. Decoder may stop decoding once it predicts an end token.

Continuing to refer to FIG. 1, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, in some embodiments, processor 102 may incorporate retrieval augmented generation (RAG) into LLM. For the purposes of this disclosure, "retrieval-augmented generation" is a method that enhances a response generation capability of a large language model by integrating external, relevant information retrieved from a structured database or unstructured corpus. In some embodiments, by leveraging RAG, LLM can reduce a risk of generating incorrect or hallucinated information, instead relying on curated and contextually relevant data. For the purposes of this disclosure, "hallucination" of information refers to where a language model fabricates plausible-sounding but incorrect information. In some embodiments, processor 102 may retrieve relevant information as a function prework data 106 from internal or external medical database and the retrieved data may be input into LLM to generate manuscript 120 grounded in authoritative sources. In some embodiments, processor 102 may identify keywords or semantic elements in the query and using these elements to search a database for information.

With continued reference to FIG. 1, in some embodiments, processor 102 may utilize similarity-based fetching techniques to identify most relevant data for input to LLM. For the purposes of this disclosure, "similarity-based fetching" is a process by which a query is converted into a high-dimensional vector embedding, representing its semantic meaning, and compared with pre-computed embeddings of documents or data in a database. In some embodiments, retrieved documents with high similarity scores may be integrated into an input for LLM. In some embodiments, processor 102 may select an appropriate database for a given query based on context and sensitivity of information. In some embodiments, LLM may generate an initial response based on an input query, and this response may be then analyzed to identify additional relevant keywords or concepts. In some embodiments, these elements may subsequently be used to perform a second round of data retrieval. In a non-limiting example, additional retrieved data may then be input into LLM alongside the original query and first response to generate an output.

With continued reference to FIG. 1, in some embodiments, processor 102 may generate hypothetical document embeddings. For the purposes of this disclosure, a "hypothetical document embedding" refers to an embedding created by LLM that represents its semantic understanding of a query or preliminary response. In some embodiments, the embeddings may be compared against database embeddings to identify documents or data closely aligned with the system's understanding of a query. In some embodiments, the retrieved information may then be incorporated into an input of LLM.

With continued reference to FIG. 1, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. In some embodiments, input may include any set of data associated with prework data 106 and/or speech data 114.

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data.

With continued reference to FIG. 1, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database. As a non-limiting example, specific training set may include manuscripts. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyper-parameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments, LLM may be specifically trained using large language model (LLM) training data. In some embodiments, LLM training data may include correlations between exemplary speech data and manuscripts. LLM training data may include correlations between text data representing speech data and manuscripts. In some embodiments, LLM training data may include a set of data that is in user's voice, email, or the like to mimic them. In some embodiments, LLM training data may be consistent with any training data described in the entirety of this disclosure. In some embodiments, LLM training data may be received from one or more users, database 112, external computing devices, and/or previous iterations of processing. As a non-limiting example, LLM training data may include instructions from a user, who may be an expert user, a past user in embodiments disclosed herein, or the like, which may be stored in memory and/or stored in database 112, where the instructions may include labeling of training examples. In some embodiments, LLM training data may be updated iteratively through a feedback loop. As a non-limiting example, LLM training data may be updated iteratively through a feedback loop as a function of newly collected prework data 106, speech data 114, or the like. In some embodiments, processor 102 may be configured to generate LLM. In a non-limiting example, generating LLM may include training, retraining, or fine-tuning LLM using LLM training data or updated LLM training data. In some embodiments, processor 102 may be configured to generate manuscript 120 using LLM (i.e., trained or updated LLM).

With continued reference to FIG. 1, in some embodiments, processor 102 may route speech data 114 as a function of a data size of the speech data 114 by executing an ingress pipeline that validates, measures, and classifies each incoming recording prior to dispatch to downstream components. Upon receipt of a file or stream, processor 102 may perform container introspection to determine codec, sample rate, channel count, and duration, and may compute or verify the data size from file headers and actual byte length to account for variable bit rate and container overhead. Where speech data 114 arrives as a streaming payload, processor 102 may maintain a rolling byte counter and an estimated duration derived from observed bit rate to project the final data size prior to completion of upload, thereby enabling early routing decisions. Processor 102 may normalize metadata into a manifest that records filename, media type, measured data size in bytes, derived duration, checksum, and provenance, which may be persisted atomically to ensure idempotent processing across retries. In some embodiments, processor 102 may compare the measured data size against a size threshold to select a routing path. The size threshold may be expressed as a fixed byte limit, a duration limit, or a composite function that combines bytes, duration, and sampling parameters into an effective size metric. Processor 102 may implement the comparison inside a rules engine that evaluates predicate logic of the form f(bytes, duration, sample_rate, channels, current_load)$\leq\tau$, where $\tau$ denotes the size threshold. If the predicate evaluates true, processor 102 enqueues the speech data 114 into a transcription queue serviced by a language model 134 configured to convert the speech data 114 into a transcript 138. If the predicate evaluates false, processor 102 dispatches the speech data 114 to a segmentation queue serviced by a segmentation model 136 configured to partition the speech data into smaller segments prior to transcription. Queue selection may be implemented with a work scheduler that assigns tasks to priority lanes and enforces concurrency limits to prevent resource exhaustion. In some embodiments, processor 102 may dynamically adjust the size threshold in response to system telemetry to maintain service quality under varying load. Processor 102 may sample CPU utilization, GPU memory headroom, model inference queue depth, I/O latency, and available disk space and compute a load factor S. The effective threshold may be set as $\tau'=\tau\cdot g(S)$, where g is a monotonic function that decreases t when load is high, thereby routing more inputs to the segmentation model 136 to reduce peak memory consumption and latency. Processor 102 may apply hysteresis to $\tau'$ to prevent oscillation, ensuring that small fluctuations in S do not cause repeated path switching for successive recordings. Threshold updates may be logged with timestamped provenance in the manifest for auditability and reproducibility. In some embodiments, where speech data 114 exceeds the size threshold, processor 102 may invoke a pre-segmentation normalizer that rewrites the media into a canonical codec and sample rate to stabilize subsequent segmentation behavior and to provide consistent byte-to-duration ratios. The segmentation model 136 may then partition the audio into fixed or content-aware windows, optionally aligned to voice activity boundaries, with controlled overlap to preserve context across segment boundaries. Processor 102 generates a segment manifest listing byte offsets, timestamps, and checksums for each segment, and routes each segment individually to the language model 134 for transcription. The segment manifest enables parallel processing while preserving the ability to reconstruct the original temporal order during manuscript synthesis.

With continued reference to FIG. 1, in some embodiments, processor 102 integrates routing logic with storage-layer triggers. When speech data 114 is uploaded to a cloud repository, a file-created event may invoke a routing function that reads object metadata, including content length and user-supplied tags, to compute the data size and apply the threshold rule. Files smaller than the threshold are labeled with a "transcribe" processing class and moved to a hot bucket monitored by the language model 134 workers. Files larger than the threshold are labeled with a "segment" processing class and moved to a staging bucket where the segmentation model 136 performs partitioning. Processor 102 may employ content-addressable storage and checksum verification to avoid duplicate processing and to ensure integrity prior to dispatch. In some embodiments, processor 102 may implement backpressure and failover to maintain robustness. If the language model 134 queue depth exceeds a concurrency watermark or if available memory falls below a safety margin, processor 102 may temporarily reduce τ', diverting borderline inputs to the segmentation path until the backlog is cleared. Conversely, if the segmentation model 136 is saturated, τ' may be increased within allowed bounds to admit more direct transcription jobs. When a file nominally below the size threshold triggers out-of-memory conditions during language model 134 inference, processor 102 may abort the job gracefully, mark the manifest with a reroute flag, and requeue the file through the segmentation pipeline without user intervention. In some embodiments, processor 102 may support streaming inputs by applying incremental routing. As a live stream accumulates, processor 102 may segment the stream into rolling windows when the observed data size crosses fractional thresholds and dispatch windows to the language model 134 in near real time, while continuing to buffer the remainder. If the cumulative data size surpasses the size threshold mid-session, processor 102 may switch to segmentation-mode handling for subsequent windows and may optionally retroactively reprocess prior windows if memory pressure warrants downscaling. Segment boundaries are recorded with precise timestamps to ensure that later alignment to outline segments 122 remains consistent across mixed routing modes. For example, and without limitation, processor 102 may set a nominal size threshold at 99 megabytes for direct transcription. A 60 megabyte MP4 recording is routed directly to the language model 134 for immediate transcript generation, while a 220 megabyte MOV is routed to the segmentation model 136, which produces twelve ten-minute segments with five-second overlaps and a manifest enumerating offsets and checksums. During a transient period of high GPU utilization, τ' may be reduced to 70 megabytes, causing medium-sized files to be segmented temporarily. When system load returns to baseline, τ' may be restored, and the routing policy reverts to the nominal threshold. This routing mechanism ensures predictable resource usage and stable latency while preserving alignment fidelity for downstream manuscript synthesis.

With continued reference to FIG. 1, memory 104 contains instructions configuring processor 102 to generate a manuscript 120 as a function of outline 118 and speech data 114. For the purposes of this disclosure, a "manuscript" is a structured textual artifact representing a first-draft or intermediate draft of a book. Manuscript 120 may include chapter-level or section-level prose, annotations, metadata, and quality indicators that collectively form a coherent draft suitable for editing, review, and downstream publishing processes. In some embodiments, manuscript 120 may be generated by synthesizing transcript segments aligned with outline segments 122, wherein each outline segment corresponds to a discrete narrative unit such as a hook, thesis, body, or takeaway. In other embodiments, manuscript 120 may incorporate editorial metadata such as articulation scores, filler-word removal markers, or structural hashtags replaced with formatted headings. In some embodiments, manuscript 120 may further include cross-references to prework data 106, indicating how authorial objectives and audience specifications are addressed in the draft. As a non-limiting example, manuscript 120 may include twelve chapters, each populated with prose generated from speech data 114, and arranged according to the hierarchical structure of outline 118. A chapter titled "Framework for Market Disruption" may include a synthesized hook derived from an author's anecdote, a thesis derived from a conceptual explanation, a body including supporting evidence and case studies, and a takeaway including actionable insights. In another example, manuscript 120 may include a first draft scored at 75/100 based on clarity, accessibility, and preservation of voice, wherein the score is attached as metadata to guide subsequent editing. In some embodiments, manuscript 120 may exist in multiple versions. A preliminary manuscript 120 may include raw transcripts aligned with outline segments 122 and lightly processed to remove filler words. An intermediate manuscript 120 may include structural formatting, articulation adjustments, and pacing modifications. A final manuscript 120 may include a polished first draft compiled from all chapters, accompanied by a table of contents, introduction, and conclusion generated by processor 102 in accordance with outline instruction set 126.

With continued reference to FIG. 1, generating manuscript 120 includes segmenting speech data 114 to be aligned to a plurality of outline segments 122. In some embodiments, processor 102 may segment speech data 114 to be aligned to a plurality of outline segments 122 by executing a multimodal alignment pipeline that integrates acoustic cues, lexical markers, and structural constraints derived from outline 118. Processor 102 may first normalize the speech data 114 by converting container formats to a canonical audio stream, resampling to a target sampling rate, and applying noise suppression using spectral subtraction or Wiener filtering, thereby improving downstream detection fidelity. Processor 102 may then perform voice activity detection to identify contiguous speech regions and may optionally apply speaker diarization to separate an author channel from a director or facilitator 107 channel so that director-introduced structural markers do not contaminate author content. In some cases, processor 102 may decode the audio stream using an automatic speech recognition model that outputs a time-aligned transcript with word-level timestamps and confidence scores. Where outline 118 prescribes explicit structural markers, such as "hook," "thesis," "body," and "takeaway," processor 102 may detect segmentation tokens introduced verbally or injected by a director as hashtags and may match these tokens to a predefined segmentation dictionary using a natural language processing module. Detected tokens may be used to establish preliminary boundary indices in the time-aligned transcript, with each boundary snapped to the nearest low-energy interval indicated by prosodic features such as pause duration or local RMS energy minima to reduce mid-word cuts. In other embodiments, processor 102 may perform forced alignment by aligning the recognized transcript to a phoneme lattice generated from the acoustic signal, thereby refining word-level timestamps and improving the precision of segment boundaries. Processor 102 may compute semantic embeddings for contiguous spans of the transcript and for canonical descriptions of each outline segment 122 and may apply a sequence alignment algorithm such as dynamic time warping constrained by Sakoe-Chiba bands to map transcript spans to ordered outline segments 122, penalizing crossings that violate the prescribed order in outline 118. This produces an initial mapping from time intervals in the speech data 114 to specific outline segments 122.

With continued reference to FIG. 1, in some cases, segmenting speech data 114 may include identifying or detecting at least a lexical token matching a segmentation dictionary from the speech data 114 using a language processing module and segmenting the speech data as a function of the at least a lexical token. For the purposes of this disclosure, a "language processing module" is a computational component configured to analyze, interpret, and transform natural language data into structured representations usable by other subsystems of apparatus 100. For the purposes of this disclosure, a "lexical token" is a discrete unit of speech or text produced by a tokenization process, wherein continuous audio or text streams are segmented into recognizable elements such as words, subwords, or punctuation marks. In some embodiments, a lexical token may correspond to a complete word (e.g., "chapter," "introduction," "conclusion"), a phrase marker (e.g., "next point," "for example"), or a structural hashtag (e.g., "#hook," "#thesis") introduced during speech capture. For the purposes of this disclosure, a "segmentation dictionary" is a structured data repository containing lexical tokens or token sequences that function as segmentation cues for dividing speech data 114 into outline segments 212. In some embodiments, the segmentation dictionary may include explicit structural markers (e.g., "introduction," "summary," "conclusion"), conversational markers (e.g., "let me explain," "the next step"), or predefined hashtags used during directed interviews (e.g., "#body," "#takeaway"). In some cases, the segmentation dictionary may also include statistical weights, rules, or context windows that increase the probability of recognizing a lexical token as a valid segmentation point. As a non-limiting example, if the segmentation dictionary includes the lexical token "conclusion," processor 102 may segment the speech data at the point where this token is detected, thereby aligning the segment with a corresponding outline segment 122.

With continued reference to FIG. 1, in some embodiments, processor 102 may use a language processing module to find lexical token. The language processing module may be configured to extract, from the one or more documents, one or more words. One or more words may include, without limitation, strings of one or more characters, including without limitation any sequence or sequences of letters, numbers, punctuation, diacritic marks, symbols, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams," where all sequences of n consecutive characters are considered. Any or all possible sequences of tokens or words may be stored as "chains," for example for use as a Markov chain or Hidden Markov Model.

With continued reference to FIG. 1, language processing module may operate to produce a language processing model. Language processing model may include a program automatically generated by processor 102 and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

With continued reference to FIG. 1, language processing module may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs, as used herein, are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

With continued reference to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, language processing module may use a corpus of documents to generate associations between language elements in a language processing module may then use such associations to analyze words extracted from one or more documents and determine that the one or more documents indicate significance of a category. In an embodiment, language module and/or processor 102 may perform this analysis using a selected set of significant documents, such as documents identified by one or more experts as representing good information; experts may identify or enter such documents via graphical user interface or may communicate identities of significant documents according to any other suitable method of electronic communication, or by providing such identity to other persons who may enter such identifications into processor 102. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, processor 102 may automatically obtain the document using such an identifier, for instance by submitting a request to a database or compendium of documents such as JSTOR as provided by Ithaka Harbors, Inc. of New York.

With continued reference to FIG. 1, in some embodiments, processor 102 may treat segmentation as a sequence labeling problem and apply a conditional random field or transformer-based tagger trained to assign per-token labels corresponding to outline segments 122. The tagger may ingest token features, timestamp-derived prosodic features including pause length and speaking rate, and lexical features including cue phrases indicative of openings, transitions, or summaries. The predicted labels may be post-processed with Viterbi decoding under hard constraints derived from outline instruction set 126 to ensure global structural validity, such as enforcing that a "hook" does not follow a "takeaway" within the same chapter. In some cases, where explicit markers are missing or corrupted, processor 102 may fall back to a semantic matching routine that computes cosine similarity between embeddings of transcript windows and prototype embeddings learned for each outline segment class. Processor 102 may slide a variable-length window across the transcript with overlap, evaluate similarity to each prototype, and assign the window to the outline segment 122 with maximum similarity subject to continuity constraints and minimum-duration thresholds. Boundaries between adjacent assigned windows may then be refined by locating local minima in spectral flux or abrupt changes in prosodic cadence, thereby aligning boundaries to natural speech breaks.

With continued reference to FIG. 1, in some embodiments, processor 102 may exploit multi-channel or stereo recordings to improve segmentation. If the director's microphone is captured on a separate channel, processor 102 may detect and transcribe director utterances, isolate structural hashtags or prompts, and use their timestamps as anchors for the alignment of the author's channel to outline segments 122. Where only a single mixed channel is available, processor 102 may approximate director prompts by detecting short, high-confidence interjections that match the segmentation dictionary and assigning them zero-length anchors that do not contribute content but do define boundaries. In other embodiments, processor 102 may maintain an alignment confidence score for each proposed segment, computed from a weighted combination of ASR confidence, marker detection confidence, prosodic boundary strength, and semantic coherence with the target outline segment 122. Segments with confidence below a threshold may be reprocessed with expanded windows, alternative decoding parameters, or a higher-capacity recognition model. Processor 102 may also enforce maximum and minimum duration constraints for each outline segment type, learned from corpus of documents 116, to prevent degenerate alignments. When a segment exceeds a maximum duration, processor 102 may subdivide it into microparts keyed to submarkers or rhetorical transitions to preserve downstream rate-controlled synthesis.

With continued reference to FIG. 1, in some embodiments, processor 102 may serialize the segmentation results as a timeline data structure comprising, for each outline segment 122, a start timestamp, an end timestamp, a transcript span identifier, a confidence score, and provenance indicating whether the boundary was derived from a detected marker, a prosodic snap, or semantic alignment. This metadata may be stored with the speech data 114 so that subsequent synthesis components can retrieve precisely the content corresponding to each outline segment 122. As a non-limiting example, for a chapter defined by outline segments 122 of "hook," "thesis," "body," and "takeaway," processor 102 may produce aligned intervals such as [00:00-01:12] for "hook," [01:12-03:45] for "thesis," [03:45-12:10] for "body," and [12:10-13:05] for "takeaway," each with associated confidence and refinement provenance, thereby enabling structured, segment-level manuscript synthesis that adheres to the organizational framework of outline 118.

With continued reference to FIG. 1, generating manuscript 120 includes detecting a speech tone 140 and at least a misarticulation element 142 from speech data 114. For the purposes of this disclosure, a "speech tone" is a suprasegmental characteristic of spoken language that conveys affective, emphatic, or stylistic qualities beyond lexical content. Speech tone 140 may be derived from acoustic features such as pitch, prosody, amplitude, and spectral energy, and may also be inferred from linguistic features such as lexical choice or rhetorical emphasis. In some embodiments, speech tone 140 may be classified as persuasive, conversational, formal, or motivational based on prosodic features and lexical markers. In other embodiments, speech tone 140 may be identified as authoritative when pitch stability, reduced hesitation, and declarative lexical patterns are observed, or as hesitant when marked by irregular pauses, elongated fillers, or rising terminal intonation. As a non-limiting example, processor 102 may classify speech tone 140 as motivational when the speech data 114 exhibits elevated amplitude, rapid tempo, and frequent use of imperative verbs. In another example, speech tone 140 may be classified as reflective when slower pacing, falling intonation, and lexical markers such as "I realized" or "in hindsight" are detected.

With continued reference to FIG. 1, for the purposes of this disclosure, a "misarticulation element" is an identifiable deviation from fluent, coherent, or structurally appropriate speech present in the speech data 114. Misarticulation element 142 may include disfluencies, redundancies, or structural breaks that detract from the clarity or flow of the narrative. Misarticulation element 142 may be detected by analyzing transcripts, prosodic features, or articulation quality metrics derived from the audio stream. In some embodiments, misarticulation element 142 may comprise filler words such as "um," "uh," or "you know," detected by lexical token matching and prosodic context. In other embodiments, misarticulation element 142 may include incomplete or fragmented sentences, excessive repetition of words or phrases, or rambling discourse characterized by deviation from the outline segment 122 topic. Misarticulation element 142 may also include irregular prosodic cues such as abrupt pauses exceeding a threshold duration, overlapping speech between the entity and a facilitator 107, or articulation patterns classified as "rambling" based on low semantic density. As a non-limiting example, processor 102 may detect misarticulation element 142 when a transcript includes multiple consecutive filler tokens within a five-second span, when a speaker abandons a sentence mid-phrase, or when prosodic analysis reveals elongated pauses exceeding one second at irregular positions. In another example, misarticulation element 142 may be identified as a "hybrid" articulation style when a segment contains both fluent sections and rambling subsequences, requiring dynamic adjustment of editing aggressiveness during manuscript synthesis.

With continued reference to FIG. 1, in some embodiments, processor 102 may detect a speech tone 140 and at least a misarticulation element 142 from speech data 114 by executing a multimodal analysis pipeline that integrates acoustic signal processing, linguistic parsing, and classification modeling. Processor 102 may first preprocess speech data 114 by applying noise reduction, amplitude normalization, and silence trimming. Processor 102 may then extract acoustic features such as pitch contour, fundamental frequency (FO), spectral centroid, energy distribution, and mel-frequency cepstral coefficients (MFCCs). These acoustic features provide quantitative measures of prosody, loudness, and timbre that correlate with speech tone 140 and articulation quality. In some embodiments, processor 102 may detect speech tone 140 using a supervised classifier trained on labeled corpora of expressive speech. The classifier may input acoustic features and transcript embeddings to predict categorical tone classes such as persuasive, conversational, hesitant, authoritative, motivational, or reflective. For example, processor 102 may classify a segment as motivational if elevated amplitude, rapid tempo, and frequent imperative phrases are observed, or classify a segment as hesitant if irregular pauses, rising terminal intonation, and filler-heavy discourse are detected. In other embodiments, processor 102 may detect speech tone 140 by clustering speech segments in a prosody-embedding space, where tone categories correspond to clusters defined by pitch variability, speech rate, and spectral energy profiles. Clustering results may be mapped to tone categories stored in a tone dictionary, enabling both categorical and continuous scoring of speech tone 140.

With continued reference to FIG. 1, in some embodiments, determining at least a misarticulation element 142 may include generating a transcript 138 using speech data 114 using a language model, detecting a filler word from the transcript 138, wherein detecting the filler word may include detecting a lexical token matching a filler dictionary and a prosodic pattern of speech pauses from the speech data 114 and removing the filler word from the transcript 138 by realigning adjacent tokens. For the purposes of this disclosure, a "transcript" is a structured textual representation generated from speech data 114, wherein spoken utterances are converted into sequences of textual elements. Transcript 138 may include words, punctuation, timestamps, and speaker labels. As a non-limiting example, transcript 138 may represent the spoken sentence "um, this is my introduction" as a text string, wherein "um" is flagged as a potential filler word. For the purposes of this disclosure, a "filler word" is a linguistic unit present in spontaneous speech that does not contribute substantive semantic content but instead reflects hesitation, discourse management, or pausing. Filler words may include, without limitation, "um," "uh," "like," "you know," and "so." As a non-limiting example, an entity's narration "I was, uh, thinking about . . . " may contain "uh" as a filler word. For the purposes of this disclosure, a "lexical token" is a discrete unit of text or symbol within transcript 138 produced during the tokenization process of a language model. Lexical tokens may correspond to whole words, subwords, punctuation marks, or phoneme-like representations depending on the tokenization scheme. As a non-limiting example, the phrase "you know" may be represented as a sequence of lexical tokens ["you"] ["know"], while "thinking" may be tokenized as ["think"] ["ing"]. For the purposes of this disclosure, a "filler dictionary" is a stored data structure comprising a list of lexical tokens or token sequences predefined as filler words. The filler dictionary may be implemented as a hash map, trie, or embedding-based lookup table. As a non-limiting example, the filler dictionary may include entries {"um," "uh," "er," "you know," "like"}, which are matched against transcript 138 to detect potential filler words. For the purposes of this disclosure, a "prosodic pattern" is a measurable configuration of suprasegmental features in speech, including pitch, energy, and timing, that reflects rhythmic or intonational aspects of spoken language. Prosodic patterns may be derived from acoustic analysis of speech data 114, such as tracking fundamental frequency contours, amplitude envelopes, and temporal intervals. As a non-limiting example, a prosodic pattern may reveal elongated vowel sounds or elevated pitch during hesitation. For the purposes of this disclosure, "speech pauses" are intervals of silence or near-silence in the audio stream that occur between or within spoken utterances. Speech pauses may be detected using voice activity detection or energy thresholding and may be further categorized into filled pauses (e.g., "uh") and silent pauses. As a non-limiting example, a 500-millisecond silent gap between "I was" and "thinking" may be identified as a speech pause. For the purposes of this disclosure, "adjacent tokens" are sequential lexical tokens in transcript 138 that occur before and after a filler word or misarticulation element. Adjacent tokens are used to realign the transcript following removal of the filler word to ensure grammatical continuity and temporal alignment with speech data 114. As a non-limiting example, in the phrase "I was [uh] thinking," "I" and "was" are tokens preceding the filler, and "thinking" is the adjacent token following the filler; after removal of "uh," processor 102 may realign the transcript as "I was thinking."

With continued reference to FIG. 1, in some cases, processor 102 may apply a natural language processing pipeline to the transcript 138 to identify filler tokens (e.g., "uh," "um," "like"), incomplete sentences, repeated phrases, or tangential deviations from the target outline segment 122. Filler tokens may be detected by lexical matching to a filler dictionary and prosodic context, wherein pauses or elongated vowels exceeding a threshold duration reinforce classification as a filler event. Sentence fragments may be detected using syntactic parsers that flag clauses lacking a verb or complete dependency structure. Repetition may be detected using sliding-window n-gram matching with cosine similarity between embeddings of adjacent transcript spans. In some embodiments, processor 102 may compute articulation quality scores by measuring prosodic fluency (average pause duration, pause frequency, and speech rate), semantic density (ratio of meaningful tokens to total tokens), and syntactic completeness (percentage of grammatically valid clauses). Misarticulation element 142 may be flagged when one or more of these scores fall below predefined thresholds. For example, processor 102 may classify a segment as "rambling" if pause density exceeds a threshold of three pauses per 10 seconds and semantic density drops below 0.6. Conversely, a segment may be classified as "articulate" when fillers are sparse, sentences are complete, and prosodic flow remains stable.

With continued reference to FIG. 1, in some embodiments, determining at least a misarticulation element 142 may include using a misarticulation threshold, wherein exceeding the misarticulation threshold may trigger insertion of a misarticulation tag 144 into transcript 138. For the purposes of this disclosure, a "misarticulation threshold" is a quantitative or qualitative limit used to classify the extent of misarticulation detected in speech data 114 or transcript 138. The misarticulation threshold may be expressed as a numerical value, percentage, or score representing the frequency, duration, or severity of misarticulations such as filler words, incomplete sentences, false starts, or rambling discourse. As a non-limiting example, the misarticulation threshold may be defined as a maximum of five filler words per one hundred words of transcript 138, or as a score of 0.7 on a confidence metric derived from acoustic and linguistic alignment models. In some embodiments, processor 102 may compute the misarticulation threshold dynamically as a function of speech tone 140, contextual fluency, or user-defined quality criteria. For the purposes of this disclosure, a "misarticulation tag" is a machine-readable annotation inserted into transcript 138 to indicate the presence, severity, or location of misarticulation elements 142 relative to the transcribed text. Misarticulation tags may be embedded as inline markers, metadata attributes, or structured annotations that can guide subsequent manuscript synthesis and editing processes. As a non-limiting example, processor 102 may insert a misarticulation tag "MISART: rambling" adjacent to a segment of transcript 138 that exceeds the misarticulation threshold or may apply a graded tag such as "MISART: 0.8" to denote a quantified articulation score. In other embodiments, misarticulation tags may be aggregated at the paragraph or chapter level to produce analytics on overall articulation quality across outline segments 122.

With continued reference to FIG. 1, in some embodiments, processor 102 may calculate the misarticulation threshold by applying statistical and machine learning analyses to both acoustic features and transcript features of speech data 114. Processor 102 may first segment the speech data 114 into analysis windows, such as fixed-duration intervals (e.g., ten seconds) or linguistic units (e.g., sentences or outline segments 122). Within each window, processor 102 may detect misarticulation elements 142 including filler words, false starts, incomplete clauses, or excessive pauses. Processor 102 may then compute one or more quantitative scores that reflect articulation quality. These scores may include, without limitation, a filler ratio score defined as the number of filler words per one hundred words, a pause density score defined as the average number of pauses per thirty seconds, or an acoustic clarity score derived from phoneme recognition confidence. The misarticulation threshold may be applied as a comparison value against these scores, such that if the filler ratio score exceeds 5% or if pause density exceeds a threshold number per unit time, the segment is classified as exceeding the misarticulation threshold. In some embodiments, processor 102 may adaptively set the misarticulation threshold as a function of speech tone 140 or historical articulation patterns of the entity. For example, processor 102 may maintain an articulation profile for the entity that includes average filler rates and typical sentence lengths; deviations greater than one standard deviation above baseline may trigger misarticulation classification. Processor 102 may also integrate acoustic-linguistic confidence scores from the language model, wherein low-confidence phoneme-to-word alignments are weighted as evidence of misarticulation. Once a segment of transcript 138 exceeds the misarticulation threshold, processor 102 may insert a misarticulation tag 144. Misarticulation tags may be placed in line with the affected text or stored in a parallel metadata layer. For instance, a segment flagged for rambling may be annotated with "MISART: rambling" or with a structured JSON record {"segment_id": 12, "type": "rambling", "severity": 0.83}. These tags enable downstream manuscript synthesis modules to apply corrective strategies, such as increasing editorial aggressiveness, condensing verbose passages, or preserving distinctive author voice where misarticulation tags indicate hybrid articulation quality. As a non-limiting example, processor 102 may analyze a transcript segment "I, uh, was just, um, thinking about, like, how to begin" and detect six filler words across twelve total words, yielding a filler ratio of 50%, which exceeds a misarticulation threshold of 10%. Processor 102 may then insert a misarticulation tag "MISART: filler_excessive" aligned to the segment, thereby marking it for downstream editing processes.

With continued reference to FIG. 1, in some embodiments, processor 102 may classify misarticulation element 142 into categories such as misarticulate, rambling, or hybrid. The classification may be performed using a machine-learning model trained on annotated transcripts labeled with articulation styles. Hybrid classification may be assigned when a segment contains alternating stretches of fluent and rambling discourse, detected by analyzing articulation scores within sliding windows and aggregating the results. For example, and without limitation, processor 102 may process a transcript segment containing the utterance "I, um, well, I think maybe the . . . the main issue is . . . " and detect filler tokens ("um," "well"), fragmented syntax, and pauses exceeding 800 milliseconds, thereby classifying this as a misarticulation element 142 with a rambling label. In another example, processor 102 may detect speech tone 140 as persuasive when the same speaker, in another segment, delivers declarative sentences with rising amplitude and rhetorical markers such as "you must" or "it is essential."

With continued reference to FIG. 1, generating manuscript 120 includes synthesizing manuscript texts 130 for each of a plurality of outline segments 122 as a function of the segmented speech data 114, speech tone 140 and at least a misarticulation element 142. For the purposes of this disclosure, “manuscript texts” are structured textual representations derived from aligning transcript spans of segmented speech data 114 with corresponding outline segments 122, while incorporating tone-aware and articulation-aware adjustments. Manuscript texts 130 may represent coherent narrative units formatted for inclusion in manuscript 120 and may preserve an entity’s unique voice while eliminating artifacts that reduce clarity or readability. In some embodiments, manuscript texts 130 may include raw transcript content aligned to outline segments 122 with filler words, false starts, and repetitions removed. In other embodiments, manuscript texts 130 may further incorporate tone-aware formatting, such as italicizing emphasized words, adjusting sentence cadence to reflect motivational speech tone 140, or smoothing transitions in reflective tone to preserve intended style. Manuscript texts 130 may also embed editing metadata, such as misarticulation tags 144 indicating whether the underlying speech data 114 was classified as misarticulate, rambling, or hybrid, thereby guiding the aggressiveness of subsequent edits. As a non-limiting example, manuscript texts 130 corresponding to a “hook” outline segment may include a cleaned transcript of an author’s anecdote, rewritten for readability but retaining colloquial phrasing to maintain a conversational speech tone 140. In another example, manuscript texts 130 corresponding to a “body” outline segment may include structured paragraphs derived from rambling speech data 114, wherein processor 102 eliminates redundancies, restructures fragmented sentences, and inserts subheadings to ensure coherence. In still another example, manuscript texts 130 corresponding to a “takeaway” outline segment may preserve the motivational tone of the speech data 114 by retaining imperative verb structures and short, emphatic sentences while omitting disfluencies and filler tokens. In some embodiments, manuscript texts 130 may be generated as intermediate artifacts, stored alongside metadata such as articulation scores, tone classifications, and segment confidence values. These manuscript texts 130 may later be compiled into a unified manuscript 120 with a table of contents, introduction, and conclusion. In other embodiments, manuscript texts 130 may include references or annotations pointing back to prework data 106, indicating where specific author-supplied goals, stories, or business objectives were incorporated into the draft.

With continued reference to FIG. 1, in some embodiments, synthesizing manuscript texts 130 may include assigning a delay interval for each of a plurality of outline segments 122 based on a length of segmented speech data 114 and a system load parameter and synthesizing the manuscript texts 130 for each of the plurality of outline segments 122 with the assigned delay interval. For the purposes of this disclosure, a “delay interval” is a scheduled time offset applied by processor 102 to defer initiation of manuscript text synthesis for a particular outline segment 122. Delay interval may be expressed in units of milliseconds, seconds, or minutes and may be dynamically computed to balance processing throughput, memory utilization, and quality of generated outputs. In some embodiments, delay interval may be proportional to the length of segmented speech data 114, such that longer recordings receive longer intervals to prevent system overload or model degradation. As a non-limiting example, processor 102 may assign a two-second delay interval for a one-minute audio segment and a six-second delay interval for a five-minute audio segment, ensuring orderly processing across all outline segments 122. For the purposes of this disclosure, a “system load parameter” is a quantitative measure of resource utilization or availability within the computing environment in which processor 102 executes. System load parameter may include, without limitation, CPU utilization, GPU memory consumption, active model inference queue depth, I/O bandwidth usage, or network latency. Processor 102 may sample system load parameter in real time and incorporate it into the calculation of delay intervals to distribute computational demand. As a non-limiting example, if GPU utilization exceeds 80% or if model queue depth surpasses a threshold of ten jobs, processor 102 may increase assigned delay intervals by a multiplicative factor, such as 1.5×, to mitigate risk of overload. In some embodiments, processor 102 may combine both the length of segmented speech data 114 and the current system load parameter into a delay interval function, f (length, load), delay, wherein delay grows with increasing segment length and increasing load factor. This ensures that manuscript texts 130 are synthesized in a controlled and paced manner, preventing overutilization of computational resources while maintaining alignment between outline segments 122 and their associated manuscript texts 130.

With continued reference to FIG. 1, in some embodiments, processor 102 may assign a delay interval for each of a plurality of outline segments 122 by computing a pacing value as a function of a measured length of the segmented speech data 114 and a system load parameter sampled from runtime telemetry. Processor 102 may first normalize the segmented speech data 114 length into a canonical metric such as token count L_tok derived from an automatic speech recognition transcript, character count L_char, or audio-duration L_sec adjusted by speaking rate estimated from prosodic features. Concurrently, processor 102 may sample system load parameter S that aggregates CPU utilization, GPU memory headroom, active inference queue depth, disk I/O latency, and network round-trip time into a scalar load factor through a weighted aggregation $S=w1\cdot CPU+w2\cdot GPU+w3\cdot Q+w4\cdot IO+w5\cdot RTT$ normalized to [0,1]. The delay interval D for a given outline segment_i may then be computed by a pacing function f that increases monotonically with both L and S, for example $D\_i=clamp(\alpha\cdot L\_tok,i+\beta, D\_min, D\_max)\cdot g(S)$, where $g(S)=1+\kappa\cdot S$ provides multiplicative expansion under load, and clamp enforces lower and upper bounds to prevent starvation or burst dispatch. In some embodiments, processor 102 may assign each outline segment_i a ready-at timestamp T_i by adding the computed delay interval D_i to a monotonic clock, $T\_i=now(\ )+D\_i$, and enqueues a synthesis job descriptor containing identifiers for the outline segment, the aligned transcript span, the computed T_i, and the generation parameters into a rate-limited work queue. A scheduler thread continuously selects jobs whose ready-at timestamps have elapsed, subject to concurrency guards tied to the system load parameter S. When S indicates high utilization or when inference queue depth exceeds a watermark, the scheduler may temporarily elevate D_i for not-yet-dispatched jobs via $D\_i'=D\_i\cdot g'(S)$ and recompute T_i accordingly, thereby implementing back-pressure without dropping work. Processor 102 may inject a small randomized jitter & uniformly sampled from [−J,J] milliseconds into D_i to decorrelate simultaneous releases and reduce thundering herd effects. In some embodiments, synthesis of manuscript texts 130 for each outline segment 122 is performed via constrained decoding that respects structural and tone constraints while operating under the pacing schedule. At dispatch time, processor 102 prepares the input bundle by loading the segmented speech data 114, the corresponding outline segment label, speech tone 140 classification, and any misarticulation tags. Processor 102 invokes a generation model with a bounded token budget proportional to L_tok,i and passes control tokens or rule constraints derived from the outline instruction set. During inference, the scheduler enforces a maximum number of concurrent GPU kernels and a per-job memory cap; if resource checks fail mid-run, the job is paused, its intermediate state checkpointed, and it is rescheduled with an increased delay interval computed from the current S to allow resources to recover before resumption.

With continued reference to FIG. 1, in some embodiments, processor 102 may subsidize long outline segments 122 into microparts prior to synthesis when L exceeds a threshold L_thr to further smooth load. The subdivision may create K parts with overlapping context windows to preserve coherence and assigns each micropart its own delay interval D_i,k computed from its local length and the contemporaneous system load parameter. The scheduler dispatches microparts in order with enforced gaps between K dispatches to maintain steady-state throughput. As each micropart finishes, processor 102 writes an immutable checkpoint containing generated text, token usage, latency, and the S snapshot used to compute D_i,k, which enables idempotent retry and post-hoc analysis of pacing efficacy. In some embodiments, processor 102 may maintain a pacing controller that updates function parameters (α, β, κ, D_min, D_max, and L_thr) based on rolling telemetry of error rates, timeout occurrences, and quality metrics of the synthesized manuscript texts 130. If elevated error rates correlate with under-delayed long segments, the controller increases a or D_min; if latency targets are exceeded despite low error rates, the controller may reduce K to tighten the coupling to S. Processor 102 may persist these parameter updates with versioned configuration so that each synthesized manuscript text 130 can be traced to the pacing policy in effect at dispatch time. For example, and without limitation, when outline segment_i corresponds to a "body" section with L_tok,i=2,800 tokens and the system load parameter S=0.6, processor 102 may compute D_i=clamp(α·2,800+β, D_min, D_max)·(1+κ·0.6). With α=0.2 s/1,000 tokens, β=0.5 s, D_min=0.5 s, D_max=10 s, and κ=0.5, D_i evaluates to approximately 1.34 seconds plus jitter. The scheduler assigns T_i=now( )+1.34 s, and upon elapse dispatches synthesis with a token budget consistent with L_tok,i. If GPU queue depth spikes raising S to 0.85 before dispatch, D_i is recomputed to ~1.77 seconds and T_i is updated accordingly, ensuring the job is deferred just enough to avoid overload while preserving ordering and continuity across all outline segments 122.

With continued reference to FIG. 1, in some embodiments, processor 102 may synthesize manuscript texts 130 for each of a plurality of outline segments 122 as a function of segmented speech data 114, speech tone 140, and at least a misarticulation element 142 by executing a multi-stage generation pipeline that integrates alignment, disfluency mitigation, tone preservation, and structural formatting. Processor 102 may first align each segment of segmented speech data 114 with a target outline segment 122 by referencing segmentation metadata comprising start and end timestamps, lexical markers, and segment identifiers. The aligned transcript span may be retrieved from storage and normalized by removing non-speech elements, applying casing corrections, and standardizing punctuation.

With continued reference to FIG. 1, in some embodiments, processor 102 may detect and remove misarticulation element 142 within each aligned segment before text synthesis. Misarticulation element 142 such as filler tokens ("um," "uh," "like"), repetitions, and incomplete phrases may be identified through lexical matching and prosodic cues and removed by re-aligning adjacent tokens in the transcript. When misarticulation element 142 is classified as "rambling," processor 102 may invoke restructuring operations that collapse tangential sentences, reorder clauses to restore logical flow, and truncate low-density content. When misarticulation element 142 is classified as "articulate," processor 102 may preserve sentence rhythm and only perform minimal surface edits, thereby retaining the author's unique voice.

With continued reference to FIG. 1, in some embodiments, processor 102 may incorporate detected speech tone 140 into manuscript text synthesis to preserve stylistic authenticity. For example, when speech tone 140 is classified as motivational, processor 102 may bias sentence construction toward shorter, imperative sentences and maintain elevated lexical intensity. When speech tone 140 is classified as reflective, processor 102 may preserve longer clauses with introspective lexical markers. Tone information may be encoded as control signals or prompt templates injected into a language generation model, ensuring stylistic fidelity across manuscript texts 130. Processor 102 may further synthesize manuscript texts 130 by applying constrained natural language generation techniques. In some cases, processor 102 may use a transformer-based generation model conditioned on outline segment type, speech tone 140, and articulation quality metadata. The model may generate alternative candidate paragraphs for each outline segment 122, which are scored by an articulation-aware scoring function that penalizes redundancy, rewards clarity, and enforces alignment with structural rules encoded in outline instruction set 126. The candidate with the highest score may be selected as manuscript text 130 for that segment. In other embodiments, processor 102 may synthesize manuscript texts 130 using a template-driven rewriting engine. For example, when an outline segment 122 is classified as a "takeaway," processor 102 may select a template requiring a directive sentence followed by an application example, then fill the template with content derived from segmented speech data 114. When an outline segment 122 is classified as a "hook," processor 102 may preserve narrative style by extracting an anecdote, trimming misarticulation elements 142, and reformatting the content into a story-driven introduction.

With continued reference to FIG. 1, in some embodiments, processor 102 may preserve pacing consistency across manuscript texts 130 by enforcing length constraints derived from the average duration of segmented speech data 114. For long segments exceeding a threshold, processor 102 may divide content into multiple subparts with transitional sentences automatically generated to maintain cohesion. Processor 102 may also apply prosody-informed sentence breaking, aligning sentence boundaries with natural pause locations in the speech data 114, thereby ensuring readability while maintaining the author's original rhythm. For example, and without limitation, when an author provides segmented speech data 114 corresponding to a "body" outline segment, processor 102 may first remove filler words and repetitions (misarticulation element 142), detect an authoritative speech tone 140, and synthesize manuscript text 130 that restructures the transcript into declarative, evidence-driven paragraphs while retaining strong, formal phrasing. In another example, when segmented speech data 114 corresponding to a "hook" outline segment contains rambling discourse with frequent pauses, processor 102 may compress content into a concise anecdote, eliminate digressions, and inject transitional phrasing while preserving conversational tone to maintain authenticity.

With continued reference to FIG. 1, in some cases, generating outline 118 and manuscript 120 may include generating a module instruction set 146 as a function of parameters associated with the generation of the outline 118 and the manuscript 120 and executing the module instruction set 146 to trigger an activation of at least one of a plurality of processing modules 148, wherein each of the plurality of processing modules 148 may be configured to perform a task associated with the generation of the outline 118 or the manuscript 120, wherein the task may include invoking a language model 134 to generate the manuscript 120. For the purposes of this disclosure, a "module instruction set" is a machine-interpretable specification artifact encoded in a structured schema that establishes a deterministic configuration state for a computing system at a given point in the workflow. In some embodiments, a facilitator 107 may manually input module instruction set 146. In a non-limiting example, the facilitator 107 may access a graphical user interface 108 or workflow dashboard configured to display a plurality of available processing modules 148, such as transcription modules, refinement modules, or orchestration modules. Through this interface, the facilitator 107 may define or modify parameters of module instruction set 146, including the sequence of activation, dependency hierarchy, and data routing logic among processing modules. In some cases, the facilitator 107 may specify conditional triggers within module instruction set 146 that determine when particular modules are invoked. For instance, and without limitation, the facilitator 107 may define an instruction that automatically routes chapter-level audio data to a transcription module when a file upload event occurs or activates a refinement module when an articulation tag indicates a rambling section. In one or more embodiments, the facilitator 107 may assign processing parameters such as model identifiers, delay intervals, or confidence thresholds to guide the operation of each module within the instruction set. As a non-limiting example, a facilitator 107 may input a module instruction set 146 that configures processor 102 to first invoke an automatic speech recognition module to generate a transcript 138, then execute an articulation assessment module to classify the transcript 138 as articulate, rambling, or hybrid, and subsequently trigger an automation workflow to compile and store the refined transcript 138 in a designated repository. In some embodiments, processor 102 may record and version each facilitator-specified module instruction set 146, enabling later reuse, modification, or rollback of workflow configurations to support consistent manuscript generation across sessions.

With continued reference to FIG. 1, for the purposes of this disclosure, "processing modules" are discrete computational units instantiated as processes, services, containers, or callable libraries that are identifiable by stable interfaces and versioned artifacts. In some embodiments, a processing module may be local, executed within the same computing environment as processor 102, such as a containerized microservice or on-device execution thread. In other embodiments, a processing module may be remote, implemented as an external or third-party automation service communicatively coupled to processor 102 through one or more network interfaces or application programming interfaces (APIs). As a non-limiting example, a processing module may include an event-driven automation platform, or a comparable orchestration service configured to perform defined workflow actions, such as triggering transcription, applying refinement models, or assembling structured outputs in response to data events. In such embodiments, processor 102 may transmit structured payloads comprising speech data 114, outline identifiers, or articulation metadata to the automation module, receive processed results, and integrate those results into downstream stages of outline or manuscript generation. For the purposes of this disclosure, a "task" is an atomic unit of work represented as a schedulable job descriptor that associates inputs, identifiers, and execution constraints with a single invocation of a processing module 148.

With continued reference to FIG. 1, in some embodiments, each chapter's audio file associated with speech data 114 may be processed through an automated orchestration layer (e.g., processing modules 148). These automations may function as workflow triggers that execute upon file upload or completion of transcription. Each audio file corresponding to a discrete outline segment 122 or chapter-level recording may initiate a sequence of actions that include invoking a transcription service or module, executing natural language refinement, and appending metadata tags used to control downstream synthesis of manuscript 120. In some embodiments, processor 102 may interface with third-party automation services via API endpoints, enabling event-based dispatch of transcription jobs, polling of transcription status, and structured retrieval of transcribed content for further processing within apparatus 100. In one or more embodiments, the automation pipeline may apply AI-based refinement to transcribed text conditionally, depending on articulation-related metadata derived from misarticulation elements 142. For example, and without limitation, upon completion of a transcription task, the automation service or one or more of processing modules 148 may inspect misarticulation tags 144 or articulation classifications. In some embodiments, the automation layer may assemble results of transcription and refinement into structured prose aligned to outline segments 122. Processor 102 may receive JSON or XML payloads containing cleaned text, articulation scores, and segment identifiers from the automation workflow. These payloads may be integrated into the internal data model of manuscript 120, enabling processor 102 to synthesize manuscript texts 130 in accordance with outline 118. Each payload may also include audit metadata, such as time of transcription, applied refinement model identifier, and tag history, to support reproducibility and quality tracking across chapters.

With continued reference to FIG. 1, in some embodiments, parameters associated with the generation of outline 118 may include structural parameters that encode a chapter cardinality target, a hierarchical depth limit for section nesting, and an ordering constraint vector derived from document pattern 128, corpus-selection parameters that encode retrieval thresholds such as a minimum review rating, a minimum number of reviews, a best-seller designation, a publication recency window, and a subject-domain filter, alignment parameters that encode mappings between semantic embeddings of prework data 106 and archetypal outline segment types, and rule-weight parameters that encode probabilities or penalties for permitted transitions among outline segments 122. As a non-limiting example, parameters for outline 118 may specify a twelve-chapter target, a maximum subsection depth of two, an Introduction, Problem, Framework, Case-Studies, Implementation, Conclusion order skeleton with tolerance bands, retrieval thresholds of at least 4.2 average rating and at least 1,000 reviews, and an alignment map that binds "pain points" descriptors to hook segments and "method steps" descriptors to takeaway segments. In some embodiments, parameters associated with the generation of manuscript 120 may include synthesis parameters that encode per-segment token budgets, maximum paragraph lengths, and decoding constraints tied to outline instruction set 126, articulation-control parameters that encode misarticulation thresholds, articulation class labels for each segment, and edit-aggressiveness levels calibrated to preserve authorial phrasing, tone-control parameters that encode speech tone 140 categories and style-preservation priors, pacing parameters that encode delay intervals computed from segmented speech data 114 length and a system load parameter, and integrity parameters that encode hallucination-mitigation bounds, semantic divergence thresholds relative to transcript spans, and reference-anchoring requirements. As a non-limiting example, parameters for manuscript 120 may specify 2,000 tokens for a body segment and 300 tokens for a hook segment, a misarticulation threshold of five fillers per one hundred words with hybrid-class support, a persuasive tone prior for chapters 1-3, delay intervals scaled by measured GPU queue depth, and a semantic divergence ceiling that rejects generated text exceeding a cosine distance threshold from the aligned transcript window.

With continued reference to FIG. 1, in some embodiments, module instruction set 146 may be materialized as a versioned specification instance that binds the foregoing parameters to explicit identifiers of processing modules 148 and declares task precedence and resource constraints. By way of illustration in continuous prose, the module instruction set 146 may reference a retrieval module that assembles the corpus of documents 116 under the stated retrieval thresholds, a pattern-mining module that emits document pattern 128, an outline-generation module that instantiates outline model 124 under the structural parameters and rule weights, a capture-ingest module that normalizes speech data 114, a segmentation-and-alignment module that produces outline-segment-aligned transcript spans, a synthesis module that invokes a language model 134 under tone-control and articulation-control parameters, and a compile-and-emit module that assembles manuscript texts 130 into manuscript 120 while persisting metadata and generating a manuscript link within graphical user interface 108.

With continued reference to FIG. 1, in some embodiments, processor 102 may generate a module instruction set 146 as a function of parameters associated with the generation of the outline 118 and the manuscript 120 by executing a compilation process that transforms abstract workflow parameters into a structured execution specification. Processor 102 may first collect parameters from multiple subsystems, including retrieval thresholds for corpus selection, structural constraints for outline 118, articulation thresholds for manuscript synthesis, and pacing parameters such as delay intervals and system load parameters. These parameters may be normalized into a canonical schema such as a JSON, XML, or protocol-buffer format to ensure deterministic serialization. Processor 102 may validate the parameter set against a schema definition that enforces required fields, allowed value ranges, and inter-field consistency. For example, if a misarticulation threshold is defined but no articulation-class mapping is provided, processor 102 may automatically insert a default articulation mapping to maintain semantic integrity of the instruction set. Once validated, processor 102 may generate module instruction set 146 by embedding the parameter values into a directed acyclic graph (DAG) of tasks, each associated with an activation rule and resource constraints. Each node in the DAG may correspond to a processing module 148, and edges represent task dependencies such as "corpus retrieval must precede document pattern extraction" or "speech segmentation must precede manuscript synthesis." Each node entry in the instruction set may contain: module identifier (e.g., outline-generation, segmentation, synthesis), input and output schemas, execution constraints (e.g., token budget≤2,000, GPU memory≥8 GB), and parameter overrides (e.g., misarticulation threshold=0.07, tone-control=persuasive). The completed instruction set may be versioned and cryptographically signed by processor 102 to ensure reproducibility and auditability across manuscript generation runs.

With continued reference to FIG. 1, to execute the module instruction set 146, processor 102 may instantiate a workflow engine that reads the DAG and enqueues tasks in topological order while respecting dependencies and resource constraints. When a task reaches a ready state, processor 102 triggers activation of the corresponding processing module 148. Activation may involve launching a container, instantiating a service call via RPC or REST API, or invoking a dynamic library in process memory. For example, activation of the outline-generation module may involve loading outline model 124 with parameters derived from the document pattern 128, while activation of the synthesis module may involve invoking a transformer-based language model 134 with token budget and tone-control parameters. Processor 102 may monitor each activation through telemetry hooks that report latency, memory consumption, token usage, and quality metrics, which are fed back into adaptive control loops to adjust subsequent task scheduling. In some embodiments, processor 102 may assign unique job descriptors to each task, which include an identifier, input hashes, output destination paths, and state flags. Processor 102 uses these descriptors to track task progression from "pending" to "running" to "complete." If a task fails due to resource exhaustion or quality check violations, processor 102 may consult the module instruction set 146 for retry policies or fallbacks. For example, if synthesis with a large outline segment fails due to memory constraints, processor 102 may re-route the segment through a segmentation model 136 preserving compliance with the instruction set.

With continued reference to FIG. 1, in some embodiments, processor 102 may implement concurrency management across modules. For example, multiple synthesis tasks for different outline segments 122 may be run in parallel, subject to GPU availability as measured by system load parameters. Processor 102 may stagger dispatch using computed delay intervals to avoid saturating shared resources. Processor 102 may also enforce quality-of-service constraints such as prioritizing "hook" or "thesis" segments in the outline 118 for earlier synthesis, since these may be required for preliminary review by the entity, while deferring "appendix" segments until later. As a non-limiting example, processor 102 may generate a module instruction set 146 specifying a retrieval module must gather corpus of documents 116 meeting thresholds of 4.5-star average rating and 1,000 reviews, a pattern-mining module must extract a twelve-chapter archetype, an outline-generation module must configure outline model 124 with a maximum subsection depth of two, a segmentation module must partition a 120-minute video into twelve ten-minute aligned segments, and a synthesis module must invoke a transformer-based language model 134 with 2,000-token budgets per segment, misarticulation threshold=0.05, and persuasive tone prior. Processor 102 executes this instruction set sequentially and in parallel as allowed, activating each processing module 148 in turn. The resulting outputs may be persisted to storage and surfaced to the entity through graphical user interface 108, thereby completing the workflow defined by module instruction set 146.

With continued reference to FIG. 1, in some cases, generating manuscript 120 may include generating a manuscript score of the manuscript 120 using a plurality of evaluation metrics and at least a misarticulation element 142, wherein generating the manuscript score may include weighting each evaluation metric according to predefined criteria. For the purposes of this disclosure, a "manuscript score" is a quantitative representation of manuscript 120 quality generated by processor 102 as a function of multiple evaluation metrics and misarticulation elements 142. The manuscript score may be expressed as a scalar value, a normalized percentage, a categorical grade, or a composite index, and may be used to provide feedback to an entity, trigger editing workflows, or benchmark manuscripts relative to reference corpora. As a non-limiting example, the manuscript score may be represented as a value between 0 and 100, where values above 75 indicate manuscript 120 meets minimum publication readiness, values between 50 and 75 indicate moderate editing required, and values below 50 indicate significant revision required. For the purposes of this disclosure, "evaluation metrics" are measurable attributes of manuscript 120 or its constituent manuscript texts 130 that reflect structural, semantic, or stylistic quality. Evaluation metrics may include, without limitation, substance and structure metrics (e.g., chapter cohesion, adherence to outline 118), reader value and activation metrics (e.g., actionability, clarity of problem-solution framing), clarity and accessibility metrics (e.g., readability index, jargon frequency, sentence length distribution), and voice preservation metrics (e.g., similarity of manuscript texts 130 to entity's articulation style). As a non-limiting example, processor 102 may compute an evaluation metric of clarity using a Flesch-Kincaid score, an evaluation metric of voice preservation using cosine similarity between manuscript texts 130 embeddings and raw transcript embeddings, and an evaluation metric of articulation using the number of misarticulation tags per outline segment 122. For the purposes of this disclosure, "predefined criteria" are weighting rules, thresholds, or priority schemes established in advance to govern how evaluation metrics are combined into a single manuscript score. Predefined criteria may include absolute weights (e.g., structure=0.3, clarity=0.25, reader value=0.25, voice preservation=0.2), dynamic weights that adjust according to document type (e.g., higher weight on clarity for instructional texts, higher weight on voice for memoirs), or threshold-based adjustments (e.g., if misarticulation element 142 exceeds the threshold, reduce final manuscript score by 10%). As a non-limiting example, predefined criteria may dictate that manuscripts with articulation scores below 0.6 automatically cap the composite manuscript score at 70 regardless of other metrics.

With continued reference to FIG. 1, in some embodiments, processor 102 may generate a manuscript score of manuscript 120 using a multi-stage scoring pipeline that integrates a plurality of evaluation metrics and at least one misarticulation element 142 and weights each evaluation metric according to predefined criteria. Processor 102 may first preprocess manuscript 120 by dividing it into analysis units such as outline segments 122, paragraphs, or sentences. For each unit, processor 102 may extract features relevant to structural, semantic, and stylistic evaluation. These features may include token counts, sentence length distributions, readability indices, semantic embeddings, articulation profiles, and tone alignment measures. Processor 102 may persist these features in a feature matrix indexed by segment identifiers to allow aggregation across the entire manuscript 120. In some embodiments, processor 102 may compute individual evaluation metrics from the extracted features. Structural metrics may be calculated by comparing the arrangement of outline segments 122 against the expected document pattern 128, yielding a structure cohesion score. Reader value metrics may be derived from semantic embeddings compared against an external corpus of high-quality exemplars, producing a cosine similarity or alignment score. Clarity metrics may be computed using natural language readability indices such as Flesch-Kincaid or Gunning Fog, adjusted by jargon detection frequency. Voice preservation metrics may be generated by comparing stylistic embeddings of manuscript texts 130 to embeddings of raw transcript speech data 114 to quantify fidelity of authorial voice. Processor 102 may also detect misarticulation elements 142 by analyzing transcript features such as filler frequency, pause density, and articulation classification tags. These misarticulation elements 142 may be aggregated into a misarticulation score that reflects overall fluency or speech quality, and this score may be incorporated as a penalty or direct input into the manuscript scoring process. For example, exceeding a filler word threshold of 5% per hundred words may decrement the articulation component of the manuscript score by a fixed percentage, while hybrid articulation segments may be weighted differently depending on context. Once all evaluation metrics are computed, processor 102 may normalize them into a common range, such as [0,1], to allow weighted aggregation. Processor 102 retrieves predefined criteria stored in memory 104, which may specify static weights (e.g., structure=0.3, clarity=0.25, reader value=0.25, voice preservation=0.2), dynamic adjustments based on manuscript genre, or conditional penalties when misarticulation scores exceed thresholds. Processor 102 applies the weighting scheme by computing a weighted linear combination of the normalized evaluation metrics. In some embodiments, processor 102 may use more advanced weighting schemes, such as logistic regression or gradient-boosted models trained on reference manuscripts with human-assigned quality scores, wherein predefined criteria define the model parameters or hyperparameters. This allows the manuscript score to capture nonlinear interactions among metrics, such as balancing clarity and voice preservation, or penalizing manuscripts that are structurally coherent but semantically shallow. For example, and without limitation, processor 102 may compute evaluation metrics for a manuscript 120 as follows: structure=0.82, clarity=0.70, reader value=0.76, and voice preservation=0.91, with weights of 0.3, 0.25, 0.25, and 0.2, respectively. Processor 102 normalizes these values, applies the weights, and obtains a preliminary composite score of 0.80 (80/100). However, if the manuscript exhibits a misarticulation element 142 exceeding the threshold-such as 12 filler words per 100 words, processor 102 applies a penalty of 0.05, yielding a final manuscript score of 0.75 (75/100). This score may be displayed to the entity within graphical user interface 108 as an overall quality benchmark.

With continued reference to FIG. 1, memory 104 contains instructions configuring processor 102 to generate a graphical user interface 108 including manuscript 120. For the purposes of this disclosure, a "user interface" is a means by which a user and a computer system interact. For example through the use of input devices and software. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, a user may interact with user interface in virtual reality. In some embodiments, a user may interact with the user interface using a computing device distinct from and communicatively connected to at least a processor 102. For example, a smart phone, smart, tablet, or laptop operated by a user. In an embodiment, user interface may include a graphical user interface 108. A "graphical user interface," as used herein, is a graphical form of user interface that allows users to interact with electronic devices. In some embodiments, GUI 108 may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run program, and the like because clicking on them yields instant access.

With continued reference to FIG. 1, graphical user interface 108 may be rendered on an remote device 110 such as a laptop computer, tablet, smartphone, or web-based dashboard, and may include interactive controls enabling the entity to review, edit, or annotate manuscript 120. In some embodiments, graphical user interface 108 may include an entity profile section comprising identifying information such as client identifier, author name, book title, project status, and links to manuscripts in progress. In other embodiments, graphical user interface 108 may display a hierarchical navigation pane corresponding to outline 118, wherein each outline segment 122 is presented as an expandable section that reveals the corresponding manuscript texts 130. As a non-limiting example, graphical user interface 108 may include a dashboard presenting a table of chapters, each row comprising a chapter title, a status indicator (e.g., "draft complete," "pending review"), a checkbox for approval, and a hyperlink to the corresponding manuscript section. In another example, graphical user interface 108 may include a reading pane that displays the synthesized manuscript 120 alongside a transcript pane, wherein filler words or misarticulation elements 142 are visually highlighted for author review. In still another example, graphical user interface 108 may include a scoring widget presenting the articulation score, tone classification, and readability score of each manuscript segment, allowing the entity to compare structural quality across chapters.

With continued reference to FIG. 1, in some embodiments, generating graphical user interface 108 may include generating a manuscript link associated with manuscript 120 and generating the graphical user interface 108 including a user profile including the manuscript link, wherein activation of the manuscript link may cause retrieval and display of the manuscript 120 within the graphical user interface 108. For the purposes of this disclosure, a "manuscript link" is a digital pointer or address that uniquely associates manuscript with a retrievable storage location or service endpoint. Manuscript link may be represented as a uniform resource locator (URL), a file system path, a database key, or an API endpoint. Manuscript link may further include access controls, authentication tokens, or version identifiers to ensure that retrieval is secure and traceable. As a non-limiting example, manuscript link may comprise a cloud storage URL which when activated within graphical user interface 108 causes processor 102 to retrieve and render the corresponding version of manuscript 120. In another example, manuscript link may be an internal identifier mapped to a distributed database entry containing the manuscript texts 130. For the purposes of this disclosure, a "user profile" is a structured collection of metadata and identifiers maintained within graphical user interface to represent an entity. User profile may include attributes such as entity identifier, name, project title, completion status, scoring history, and manuscript link. In some embodiments, user profile may further include multiple manuscript links corresponding to different manuscripts authored by the same entity, or multiple versions of the same manuscript at different drafting stages. As a non-limiting example, user profile may display the author's name, the title of the current book project, the completion percentage of manuscript 120, the most recent manuscript score, and a clickable manuscript link to open the latest draft. In another example, user profile may include a table of manuscript projects, each row showing the manuscript title, status (e.g., "in progress," "complete"), manuscript score, and manuscript link for access.

With continued reference to FIG. 1, in some embodiments, processor 102 may generate a manuscript link associated with manuscript 120 and user profile by materializing the manuscript as a versioned object in a persistent repository and binding a resolvable identifier to that object within an identity-aware directory keyed to the user profile. Processor 102 may first serialize manuscript 120 and its constituent manuscript texts 130 into a canonical artifact, which may include a compiled document blob, a structured manifest describing table of contents, outline segments 122 mappings, articulation and tone metadata, and integrity fields such as checksums and byte lengths. The serialized artifact may be written to a storage layer such as an object store, a content-addressable store, or a document database. Upon successful write, the storage layer returns an object handle that uniquely identifies the artifact, which processor 102 records alongside a monotonically increasing version identifier, a creation timestamp, and a provenance record linking the artifact to the generation parameters and module instruction set 146 used to produce it. In some embodiments, processor 102 may construct manuscript link as a resolvable address that encodes or references the object handle and version metadata. Where a network-accessible object store is used, processor 102 may generate a uniform resource locator containing a namespace, object key, and version query parameter. Where access control is required, processor 102 may generate a time-bounded access token or a cryptographically signed URL that embeds a signature derived from a secret key, the object key, the version identifier, and an expiration epoch. The signature ensures that manuscript link cannot be forged and that access can be revoked by invalidating the signing key or by expiring the token. In other embodiments, processor 102 may generate manuscript link as an opaque identifier, such as a randomly generated UUID or content hash, which is resolved server-side by a routing service that validates permissions, locates the current or requested version of manuscript 120, and streams the artifact to the requesting client. In some embodiments, processor 102 may associate manuscript link with user profile by updating a profile record in a relational or document-oriented datastore that serves graphical user interface 108. The profile record may include fields for entity identifier, project identifier, current manuscript version, completion status, and the manuscript link. Processor 102 may perform this update within a transactional boundary to ensure referential integrity between the profile record and the stored manuscript artifact. If the system supports multiple manuscript versions per user, processor 102 may append an entry to a version history subdocument containing the manuscript link, version identifier, timestamp, manuscript score, and optional release notes, thereby enabling deterministic retrieval of prior drafts from graphical user interface 108.

With continued reference to FIG. 1, in some cases, graphical user interface 108 may include annotation tools that allow the entity to flag sections of manuscript 120 for revision, insert margin comments, or request regeneration of specific manuscript texts 130. For example, the author may highlight a "hook" segment that appears too formal and request re-synthesis with a conversational tone, wherein processor 102 regenerates the passage and updates graphical user interface 108 with the revised version.

With continued reference to FIG. 1, in some embodiments, processor 102 may generate graphical user interface 108 including manuscript 120 by constructing a presentation model from manuscript data structures and rendering the presentation model into interactive views on a client device. Processor 102 may serialize manuscript 120, manuscript texts 130, outline 118, outline segments 122, and associated metadata such as articulation classifications, tone labels, confidence scores, and status indicators into a view-model object. The view-model object may be exposed via an application programming interface implemented by processor 102, wherein a client runtime requests the view-model and renders the graphical user interface 108 using a component-based layout engine. In some cases, processor 102 may precompute pagination boundaries, anchor identifiers for chapters and outline segments, and a unique manuscript link that resolves to a canonical resource locator stored in a network-accessible repository. Upon activation of the manuscript link, processor 102 retrieves the corresponding manuscript version, applies access-control validation, and transmits a render payload to the client for display.

With continued reference to FIG. 1, in some embodiments, processor 102 may generate a navigation pane bound to outline 118 by mapping each chapter and outline segment 122 to a node in a hierarchical component tree. Each node may include identifiers, titles, status flags, and a pointer to the associated manuscript text 130. Processor 102 may generate an entity profile panel comprising client identifier, author name, book title, overall status, and the manuscript link, where selection of the manuscript link triggers retrieval and display of the latest compiled manuscript 120. To support interactive review, processor 102 may embed per-chapter checkboxes, approval toggles, and progress indicators backed by a state store; user interactions are captured as events and transmitted to processor 102, which persists the updated state and reissues an incremental render payload reflecting the new state. In some embodiments, processor 102 may render a reading pane that displays manuscript 120 and bind each paragraph to its originating outline segment 122 and speech segment timestamp. Processor 102 may generate markup that visually encodes articulation and tone metadata, for example by highlighting tokens removed as misarticulation elements 142, annotating sections with "articulate," "rambling," or "hybrid" tags, and displaying tone badges such as persuasive or reflective. Where side-by-side comparison is enabled, processor 102 may render a synchronized transcript pane with word-level timestamps and apply scroll-linked synchronization so that selecting a paragraph in manuscript 120 scrolls the transcript pane to the corresponding time interval. Processor 102 may also generate inline controls that allow the entity to request regeneration of a specific manuscript text 130, where activation of the control emits an event captured by processor 102 to enqueue a re-synthesis task and subsequently update the rendered content upon completion. In other embodiments, processor 102 may employ a reactive rendering pipeline to maintain responsiveness for large manuscripts. Processor 102 may fragment manuscript 120 into virtualized sections and stream them to the client using chunked transfer or a bidirectional transport, such as a WebSocket channel, enabling progressive rendering as content becomes available. Lazy loading may be applied to defer retrieval of low-priority chapters until the user navigates to them. Processor 102 may compute diff patches between successive versions of manuscript 120 and transmit only structural and textual deltas, which the client applies to the existing document object model to minimize reflow and repaint costs while preserving scroll position and selection state. In some embodiments, processor 102 may enforce security and version integrity by issuing signed tokens embedded in the manuscript link and associating each view with a version identifier and checksum. The graphical user interface 108 may expose a version selector populated by processor 102 with available manuscript versions and corresponding timestamps; selecting a version prompts processor 102 to retrieve the archived render payload for deterministic replay. Role-based access controls may be applied such that authors can annotate and request regeneration, directors can inject structural hashtags or approve segments, and viewers can read-only access the compiled manuscript 120. Processor 102 may log all interface events with provenance metadata to support audit trails and to drive analytics widgets that summarize completion status, per-chapter scores, and time-to-completion metrics within the graphical user interface 108.

With continued reference to FIG. 1, in one or more embodiments, apparatus 100 may employ a human-AI hybrid orchestration layer rather than continuous, model-driven generation. In such embodiments, automation services and processor 102 operate in coordination with human editors or facilitators 107 who monitor outputs, adjust parameters, or approve refinement stages before manuscript 120 is finalized. The hybrid architecture allows human oversight to shape tone, pacing, and stylistic fidelity, while the automation layer ensures consistency, efficiency, and structural alignment across all chapters. For instance, and without limitation, after a transcription job completes, a human reviewer may validate AI-refined text within a graphical user interface 108, accept or reject proposed edits, and authorize processor 102 to advance the content into the synthesis phase. This cooperative workflow improves reliability and creative integrity compared to purely automated, continuous-generation systems. This configuration provides a technical improvement by modularizing the transcription-to-synthesis pipeline into discrete, automatable units that can be independently refined, audited, and quality-controlled. The combination of event-driven automation, conditional AI refinement, and human-in-the-loop validation minimizes propagation of transcription errors and enhances fidelity between spoken input and generated manuscript output, while maintaining flexibility to incorporate additional automation services or refinement models without altering the core processing architecture.

With continued reference to FIG. 1, in one or more embodiments, a technical improvement may be provided by configuring a machine-learning model using document patterns extracted from a curated corpus of high-quality documents, thereby providing a possible solution to the problem of unstructured and generic text generation in conventional language models. By grounding model configuration in curated data that reflects proven structural conventions, the disclosed apparatus may enable generation of coherent, domain-specific outlines and manuscripts that adhere to market-validated frameworks. In one or more embodiments, a technical improvement may be provided by integrating author-specific prework data into the configuration of an outline model, thereby providing a possible solution to the problem of model outputs that fail to reflect an author's unique intent, expertise, or narrative scope. By coupling prework data with corpus-derived patterns, the system may allow an outline model to generate personalized outlines that maintain the author's objectives while conforming to effective structural norms. In one or more embodiments, a technical improvement may be provided by enabling speech-native manuscript generation through segmentation of speech data into outline-aligned segments, thereby providing a possible solution to the problem of incoherent or context-misaligned transcripts in existing dictation and transcription systems. This improvement may allow for accurate mapping of spoken input to structural components of a manuscript, facilitating efficient downstream synthesis and editing. In one or more embodiments, a technical improvement may be provided by implementing automatic detection of misarticulation elements, such as filler words, pauses, and rambling patterns, thereby providing a possible solution to the problem of degraded text quality resulting from unedited speech transcription. Through the use of prosodic analysis and filler dictionaries, the system may identify and remove misarticulations while preserving the author's voice and meaning. In one or more embodiments, a technical improvement may be provided by introducing articulation assessment and adaptive editing aggressiveness to the manuscript synthesis process, thereby providing a possible solution to the problem of over-editing or under-editing in automated text generation workflows. The disclosed apparatus may evaluate articulation quality at the segment level and may dynamically adjust editing thresholds to preserve stylistic fidelity while ensuring readability and coherence. In one or more embodiments, a technical improvement may be provided by incorporating rate-controlled synthesis through assignment of delay intervals based on speech segment length and system load, thereby providing a possible solution to the problem of computational overload and inconsistent pacing in long-form generative workflows. This feature may optimize system stability and output consistency when processing extended or high-volume speech data. In one or more embodiments, a technical improvement may be provided by generating a manuscript score using multiple evaluation metrics weighted by predefined criteria, thereby providing a possible solution to the problem of subjective or inconsistent manuscript quality evaluation. By quantifying attributes such as structure, clarity, voice preservation, and reader value, the system may produce objective and reproducible quality metrics that can guide revision and benchmarking. In one or more embodiments, a technical improvement may be provided by integrating manuscript generation and review into a unified graphical user interface, thereby providing a possible solution to the problem of fragmented authoring workflows across multiple tools. The interface may present a consolidated view of outlines, manuscript drafts, completion status, and manuscript links, thereby enabling streamlined navigation and management of authoring projects. In one or more embodiments, a technical improvement may be provided by employing modular orchestration through a module instruction set that activates specialized processing modules for distinct stages of manuscript generation, thereby providing a possible solution to the problem of rigid or monolithic generative architectures. This modular design may enable dynamic invocation of components such as corpus retrieval, pattern extraction, segmentation, and synthesis modules, thereby supporting scalability and extensibility of the system. In one or more embodiments, a technical improvement may be provided by implementing routing of speech data based on file size thresholds, thereby providing a possible solution to the problem of inefficient model utilization and processing delays in transcription workflows. By directing smaller files to a language model and larger files to a segmentation model, the system may optimize computational efficiency and reduce latency. In one or more embodiments, a technical improvement may be provided by generating secure, version-aware manuscript links associated with user profiles, thereby providing a possible solution to the problem of unreliable or fragmented access to manuscript versions across collaborative authoring environments. This approach may ensure traceable retrieval, access control, and version consistency within the graphical user interface.

Figure 2A:
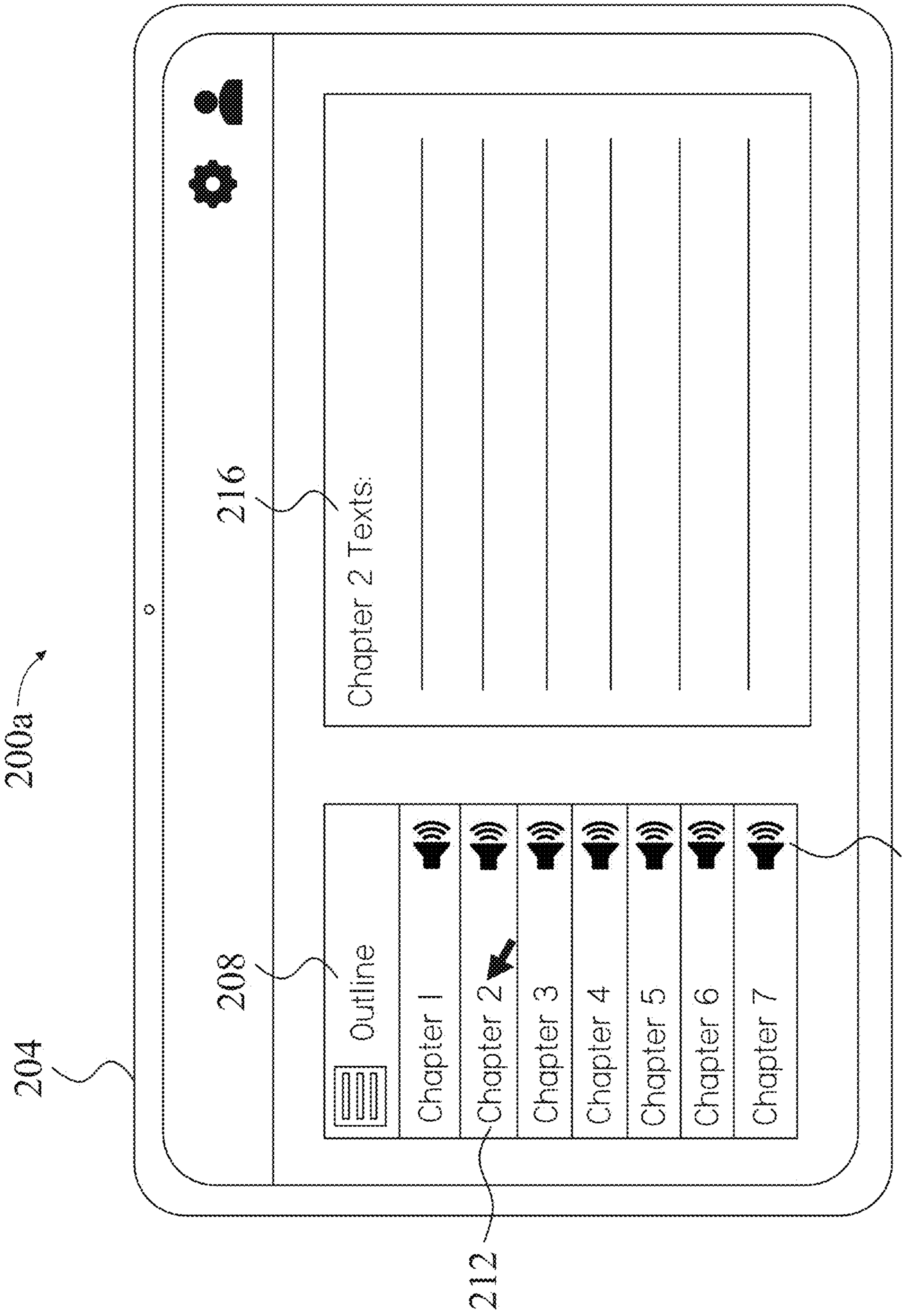
FIGS. 2A-B illustrate exemplary user interfaces.

Referring now to FIG. 2A, an exemplary user interface 200*a* is illustrated. User interface 200*a* may be rendered on remote device 204, which may include a laptop computer, tablet, smartphone, or other computing device configured to communicate with processor. User interface 200*a* may include outline 208 presented in a navigation pane, wherein outline 208 corresponds to outline 208 generated by processor as a function of prework data. Outline 208 may include a plurality of outline segments 212, each outline segment corresponding to a structural division such as a chapter, subchapter, or section of manuscript. In some embodiments, selection of an outline segment 212 may trigger retrieval and display of manuscript texts 216 corresponding to the selected outline segment. Manuscript texts 216 may include synthesized narrative content derived from segmented speech data, annotated with articulation classifications, tone indicators, and editorial metadata. In some embodiments, manuscript texts 216 may be displayed as editable paragraphs, wherein filler tokens and misarticulation elements are highlighted or removed according to processing rules. In other embodiments, manuscript texts 216 may include inline indicators of speech tone, such as labels denoting persuasive or reflective tone, and may include revision tools enabling the entity to regenerate or modify specific segments. In some embodiments, user interface 200*a* may further include one or more playback indicators 218, each playback indicator corresponding to a portion of speech data associated with a respective outline segment 212. For the purposes of this disclosure, a "playback indicator" is an interactive user interface element that enables access to an audio or audiovisual portion of speech data that has been segmented and aligned with a specific structural element of outline. In some embodiments, playback indicator 218 may be implemented as a selectable icon or control button configured to initiate playback, review, or re-recording of the speech data segment associated with a chapter, subchapter, or other narrative division. In some embodiments, processor may maintain a data linkage between playback indicator 218 and the corresponding segment of speech data stored in memory or in a remote data repository, such that selection of playback indicator 218 retrieves and streams the relevant audio content for review or editing.

Figure 2B:
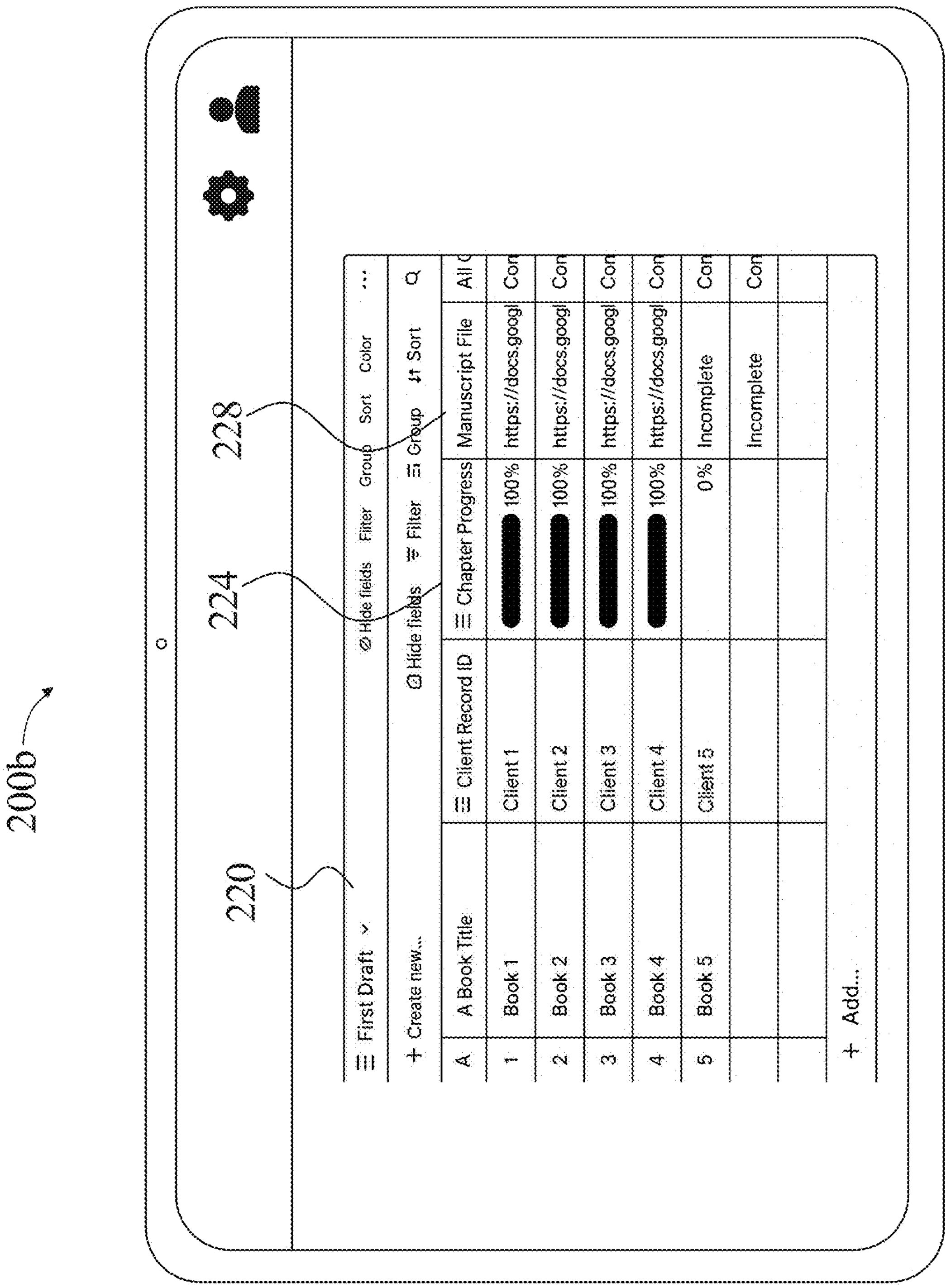

Referring now to FIG. 2B, an exemplary user interface **200*b* is illustrated. User interface 200*b* may be rendered on an remote device and may display project management information related to one or more instances of manuscript. User interface 200*b* may include entity profile 220, wherein entity profile 220 may include identifying information for an author or client. Entity profile 220 may include, without limitation, a book title, a client record identifier, and other metadata used to uniquely associate manuscript with a particular entity. In some embodiments, user interface 200*b* may further include completion status 224, wherein completion status 224 indicates progress of manuscript generation relative to outline segments or chapters. Completion status 224 may be displayed as a percentage, a graphical progress bar, or a binary status such as "complete" or "incomplete." Completion status 224 may be dynamically updated by processor as new manuscript texts are synthesized, articulation quality is assessed, or chapters are approved for inclusion in manuscript. User interface 200*b* may include manuscript link 228, wherein manuscript link 228 provides an interactive control that, when activated, causes retrieval and display of manuscript within graphical user interface. Manuscript link 228 may direct to a cloud storage resource, a document server, or a dedicated manuscript repository maintained by processor. In some embodiments, manuscript link 228 may be version-specific, ensuring that the entity can access archived versions of manuscript with consistent formatting and metadata. Manuscript link 228** may be displayed as a URL that, when selected, retrieves and renders the completed manuscript for review.

Figure 3:
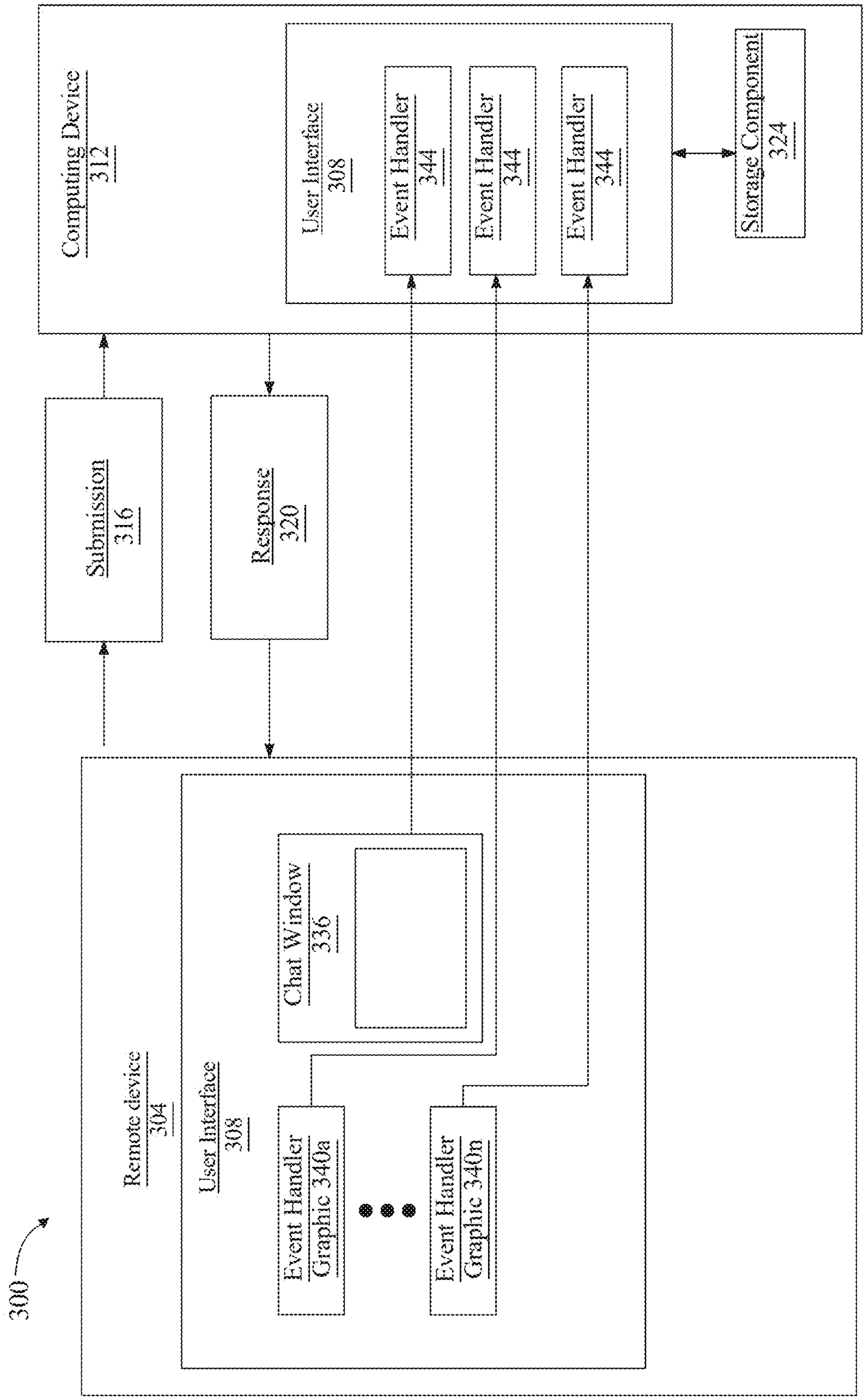
FIG. 3 illustrates a block diagram of an exemplary chatbot system.

Referring now to FIG. 3, a user interface system 300 is schematically illustrated. User interface system 300 may configure a computing device 312 to configure a remote device 304 to perform display, input, and output functions, without limitation of a user interface. According to some embodiments, a user interface 308 may be communicative with a computing device 312, such as computing device as described above, that is configured to operate a chatbot. In some cases, user interface 308 may be local to computing device 312. Alternatively or additionally, in some cases, user interface 308 may remote to computing device 312 and communicative with the computing device 312, by way of one or more networks, such as without limitation the internet. Alternatively or additionally, user interface 308 may communicate with user device using telephonic devices and networks, such as without limitation fax machines, short message service (SMS), or multimedia message service (MMS). Commonly, user interface 308 communicates with computing device 312 using text-based communication, for example without limitation using a character encoding protocol, such as American Standard for Information Interchange (ASCII). Textual communication may be made between two or more users operating user devices, each of which may be configured by computing device to implement user interface. Two or more users may communicate with one another via user interface instances; alternatively or additionally, user interface 308 may conversationally interface using a chatbot, by way of at least a submission 316, from the user interface 308 to the chatbot, and a response 320, from the chatbot to the user interface 308. In many cases, one or both of submission 316 and response 320 are text-based communication. Alternatively or additionally, in some cases, one or both of submission 316 and response 320 are audio-based communication.

Continuing in reference to FIG. 3, a submission 316 once received by computing device 312 operating a chatbot, may be processed by circuitry and/or a processor, for instance and without limitation as described above. In some embodiments, processor processes a submission using one or more of keyword recognition, pattern matching, and natural language processing. In some embodiments, processor employs real-time learning with evolutionary algorithms. In some cases, processor may retrieve a pre-prepared response from at least a storage component 324, based upon submission 316. Alternatively or additionally, in some embodiments, processor communicates a response 320 without first receiving a submission 316, thereby initiating conversation. Alternatively or additionally, processor may input user-submitted or other text as an input and may output a textual response using one or more generative artificial intelligence processes and/or components, such as without limitation an LLM or other generative model as described above. In some cases, processor communicates an inquiry to user interface 308; and the processor is configured to process an answer to the inquiry in a following submission 316 from the user interface 308. In some cases, an answer to an inquiry present within a submission 316 from a user device may be used by processor 102 as an input to another function; inputs may include without limitation, composition data, pecuniary goal data, data suitable for use as survey data, or the like. Inputs generated by a chatbot may be input, without limitation, to any process, module, component, or other element described in this disclosure that can accept an input.

Still referring to FIG. 3, apparatus may, for instance, use a client-side program to configure a user device to display data and/or to perform event handling of user inputs; such display may be implemented, without limitation, as a graphical user interface. For instance, and without limitation, apparatus may display any output of any authentication process, any output of computation of predicted message, any output of any process used in computation of predicted message, any output of any authorization process, and/or any output of processes used to perform authorization. Apparatus and/or circuitry may configure a user device to display one or more event handler graphics **340*a-n*. As used in this disclosure, an "event handler graphic 340*a-n*" is a graphical element with which a user of remote device may interact to enter data, for instance and without limitation for a search query or the like as described in further detail below. An event handler graphic 340*a-n* may include, without limitation, a button, a link, a checkbox, a text entry box and/or window, a drop-down list, a slider, or any other event handler graphic 340*a-n* that may occur to a person skilled in the art upon reviewing the entirety of this disclosure. An "event handler 344," as used in this disclosure, is a module, data structure, function, and/or routine that performs an action on remote device in response to a user interaction with event handler graphic 340*a-n*. For instance, and without limitation, an event handler 344 may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler 344 may generate prompts for further information, may compare data to validation rules such as requirements that the data in question be entered within certain numerical ranges, and/or may modify data and/or generate warnings to a user in response to such requirements. Event handler 344 may convert data into expected and/or desired formats, for instance such as date formats, currency entry formats, name formats, or the like. Event handler 344** may transmit data from remote device to apparatus and/or circuitry.

In an embodiment, and further referring to FIG. 1, event handler 344 may include a cross-session state variable. As used herein, a "cross-session state variable" is a variable recording data entered on remote device during a previous session. Such data may include, for instance, previously entered text, previous selections of one or more elements as described above, or the like. For instance, cross-session state variable data may represent a search a user entered in a past session. Cross-session state variable may be saved using any suitable combination of client-side data storage on remote device and server-side data storage on apparatus and/or circuitry; for instance, data may be saved wholly or in part as a "cookie" which may include data or an identification of remote device to prompt provision of cross-session state variable by apparatus and/or circuitry, which may store the data on apparatus and/or circuitry. Alternatively, or additionally, apparatus and/or circuitry may use login credentials, device identifier, and/or device fingerprint data to retrieve cross-session state variable, which apparatus and/or circuitry may transmit to remote device. Cross-session state variable may include at least a prior session datum. A "prior session datum" may include any element of data that may be stored in a cross-session state variable. Event handler graphic 340*a-n* may be further configured to display the at least a prior session datum, for instance and without limitation auto-populating user query data from previous sessions.

With continued reference to FIG. 3, in one or more embodiments, users may utilize instances of user interface system 300 to exchange text messages with each other. User interface 308 may include functionality to configure each or any remote device to display a chat window 336. Chat window 336 may include a window or field that displays text generated by one or more users and/or chatbot outputs, and/or a window or field for entry of textual data by a user; windows and/or fields for display and entry may be separate. An event handler graphic 340*a-n* and/or event handler 344 may transmit textual entries and/or display such entries, for instance and without limitation when a user "posts" such entries to make them visible to a chatbot and/or another user.

With continuing reference to FIG. 3, computing device 312 may be configured to the respond to a chatbot input using a decision tree. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to at least a candidate input into a chatbot. Decision tree has at least a terminal node, which may alternatively or additionally be referred to herein as a "leaf node," corresponding to at least an exit indication; in other words, decision and/or determinations produced by decision tree may be output at the at least a terminal node. Decision tree may include one or more internal nodes, defined as nodes connecting outputs of root nodes to inputs of terminal nodes. Computing device 312 may generate two or more decision trees, which may overlap; for instance, a root node of one tree may connect to and/or receive output from one or more terminal nodes of another tree, intermediate nodes of one tree may be shared with another tree, or the like.

Still referring to FIG. 3, computing device 312 may build decision tree by following relational identification; for example, relational indication may specify that a first rule module receives an input from at least a second rule module and generates an output to at least a third rule module, and so forth, which may indicate to computing device 312 in which such rule modules will be placed in decision tree. Building decision tree may include recursively performing mapping of execution results output by one tree and/or subtree to root nodes of another tree and/or subtree, for instance by using such execution results as execution parameters of a subtree. In this manner, computing device 312 may generate connections and/or combinations of one or more trees to one another to define overlaps and/or combinations into larger trees and/or combinations thereof. Such connections and/or combinations may be displayed by visual interface to user, for instance in first view, to enable viewing, editing, selection, and/or deletion by user; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. Alternatively or additionally subtrees, previously constructed trees, and/or entire data structures may be converted to APIs to interface with further iterations or steps of methods as described in this disclosure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node.

Continuing to refer to FIG. 3, decision tree may incorporate one or more manually entered or otherwise provided decision criteria. Decision tree may incorporate one or more decision criteria using an API. Decision tree may establish a link to a remote decision module, device, system, or the like. Decision tree may perform one or more database lookups and/or look-up table lookups. Decision tree may include at least a decision calculation module, which may be imported via an API, by incorporation of a program module in source code, executable, or other form, and/or linked to a given node by establishing a communication interface with one or more exterior processes, programs, systems, remote devices, or the like; for instance, where a user operating system has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision.

Figure 4:
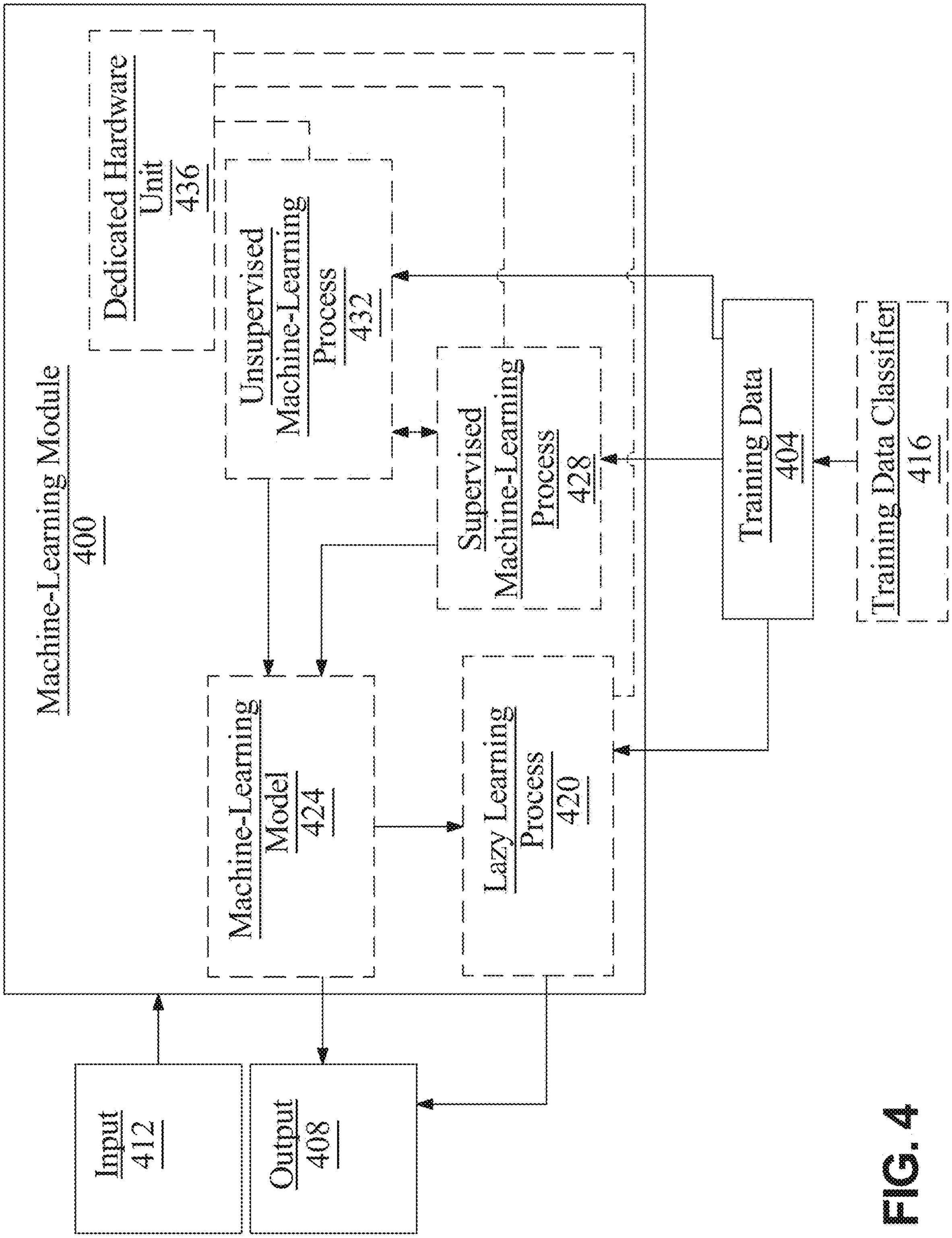
FIG. 4 illustrates a block diagram of an exemplary machine-learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process,"

as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example, input data may include prework data, speech data, corpus of documents, and the like. As a non-limiting illustrative example, input data may include outline, manuscript, and the like.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a process whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to entity cohorts related to entity's demographic such as age, gender, and the like, occupation, location, and the like.

Still referring to FIG. 4, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)\ P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where “poor quality” is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a “low-pass filter” is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as “compression,” and may be performed, for instance by an N-sample compressor implemented using hardware or software. Anti-aliasing and/or anti-imaging filters, and/or low-pass filters, may be used to clean up side-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 4, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network including an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include prework data, speech data, corpus of documents, and the like as described above as inputs, outline, manuscript, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including, without limitation, gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation, support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic “1” and “0” voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as “desired” results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A “dedicated hardware unit,” for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
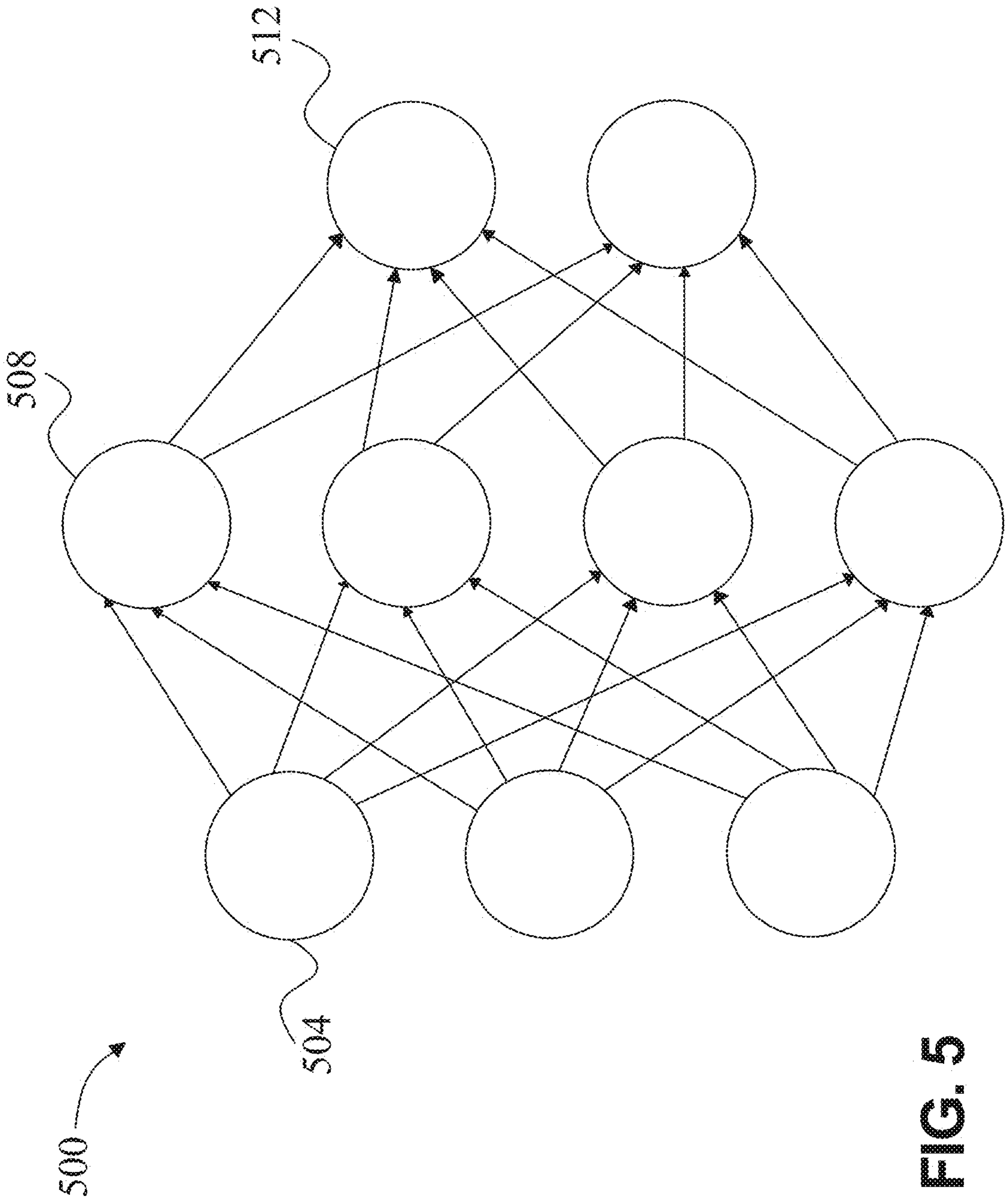
FIG. 5 illustrates a diagram of an exemplary neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network including an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like. In some embodiments, neural network 500 may be fine-tuned using an internal dataset, such as an editing corpus. As a non-limiting example, the editing corpus may include internally curated, author-verified materials such as transcripts, refined manuscript drafts, chapter-level annotations, and articulation assessments produced during human-AI collaborative editing sessions described and referenced with respect to FIG. 1.

Figure 6:
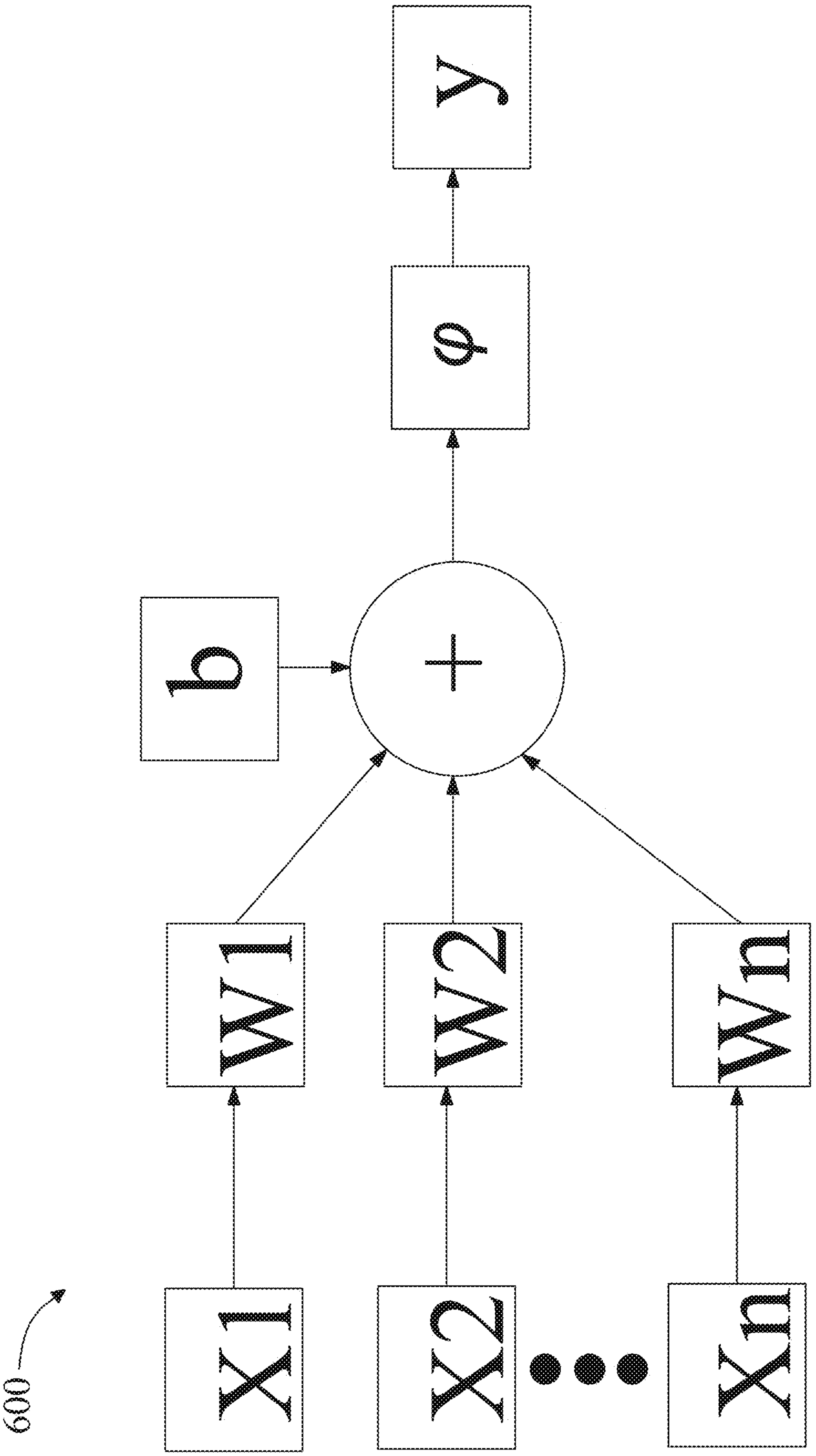
FIG. 6 illustrates a block diagram of an exemplary node in a neural network.

Referring now to FIG. 6, an exemplary embodiment of a node 600 of a neural network is illustrated. A node may include, without limitation, a plurality of inputs xi that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tan h (hyperbolic tangent) function, of the form $$\frac{e^x - e^{-x}}{e^x + e^{-x}},$$

a tan h derivative function such as $f(x)=\tan h^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as f(x)=x*sigmoid(x), a Gaussian error linear unit function such as $f(x)=a(1+\tan h(\sqrt{2/\pi}(x+bx^r)))$ for some values of a, b, and r, and/or a scaled exponential linear unit function such as $$f(x) = \lambda\begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha \frac{dJ}{dw}$$

where $w_{new}$ is the updated weight value, $w_{old}$ is the previous weight value, α is a parameter to set the learning rate, and $$\frac{dJ}{dw}$$

is the partial derivative or with respect to weight w.

Figure 7:
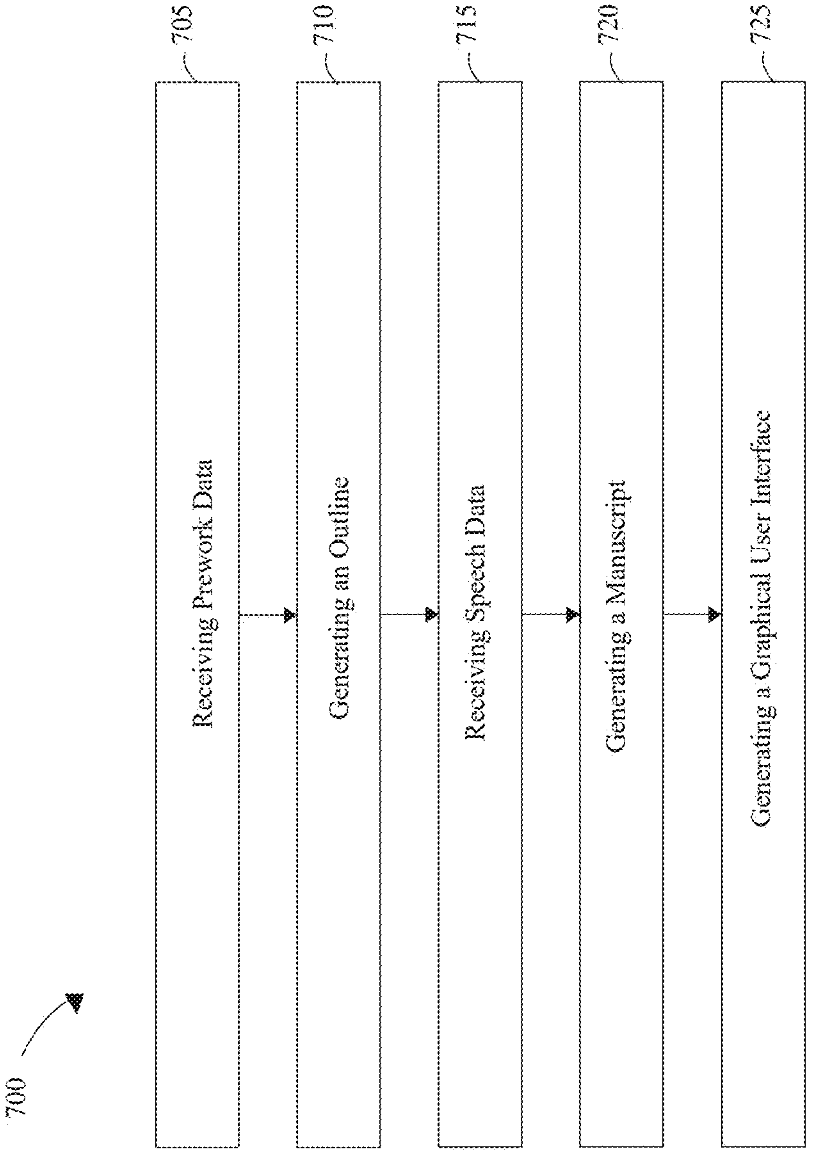
FIG. 7 illustrates a flow diagram of an exemplary method of machine-learning model configuration.

Referring now to FIG. 7, a flow diagram of an exemplary method 700 of machine-learning model configuration is illustrated. Method 700 contains a step 705 of receiving, using at least a processor, prework data. This may be implemented with reference to FIGS. 1-6.

With continued reference to FIG. 7, method 700 contains a step 710 of generating, using at least a processor, an outline including a plurality of outline segments using an outline model as a function of prework data, wherein generating the outline includes retrieving a corpus of documents as a function of a plurality of retrieval thresholds, extracting at least a document pattern from the corpus of documents, generating an outline instruction set for the outline model as a function the at least a document pattern, and configuring the outline model as a function of the outline instruction set. These may be implemented with reference to FIGS. 1-6.

With continued reference to FIG. 7, method 700 contains a step 715 of receiving, using at least a processor, speech data in response to generation of an outline. In some embodiments, receiving the speech data may include receiving a video, and extracting the speech data from the video using an automatic speech recognition module, wherein extracting the speech data may include isolating an audio stream from the video, extracting at least an audio feature from the audio stream using a spectral transformation, and decoding the at least an audio feature into a textual element. In some embodiments, receiving the speech data may include routing the speech data as a function of a data size of the speech data, wherein routing the speech data may include routing the speech data including the data size less than a size threshold to a language model configured to convert the speech data into a transcript, and routing the speech data including the data size greater than the size threshold to a segmentation model configured to partition the speech data into smaller segments. In some embodiments, receiving the speech data may include receiving the speech data from a recording device operated by a facilitator. These may be implemented with reference to FIGS. 1-6.

With continued reference to FIG. 7, method 700 contains a step 720 of generating, using at least a processor, a manuscript as a function of an outline and speech data, wherein generating the manuscript includes segmenting the speech data to be aligned to the plurality of outline segments, detecting a speech tone and at least a misarticulation element from the speech data, and synthesizing manuscript texts for each of the plurality of outline segments as a function of the segmented speech data, the speech tone and the at least a misarticulation element. In some embodiments, detecting the at least a misarticulation element may include generating a transcript using the speech data using a language model, detecting a filler word from the transcript, wherein detecting the filler word may include detecting a lexical token matching a filler dictionary and a prosodic pattern of speech pauses from the speech data, and removing the filler word from the transcript by realigning adjacent tokens. In some embodiments, detecting the at least a misarticulation element may include using a misarticulation threshold, wherein exceeding the misarticulation threshold triggers insertion of a misarticulation tag into the transcript. In some embodiments, synthesizing the manuscript texts may include assigning a delay interval for each of the plurality of outline segments based on a length of the segmented speech data and a system load parameter, and synthesizing the manuscript texts for each of the plurality of outline segments with the assigned delay interval. In some embodiments, generating the manuscript may include generating a module instruction set as a function of parameters associated with the generation of the outline and the manuscript, and executing the module instruction set to trigger an activation of at least one of a plurality of processing modules, wherein each of the plurality of processing modules is configured to perform a task associated with the generation of the outline or the manuscript, wherein the task may include invoking a language model to generate the manuscript. In some embodiments, segmenting the speech data may include identifying or detecting at least a lexical token matching a segmentation dictionary from the speech data using a language processing module, and segmenting the speech data as a function of the at least a lexical token. These may be implemented with reference to FIGS. 1-6.

With continued reference to FIG. 7, method 700 contains a step 725 of generating, using at least a processor, a graphical user interface including a manuscript. In some embodiments, generating the graphical user interface may include generating a manuscript link associated with the manuscript, and generating the graphical user interface including a user profile including the manuscript link, wherein activation of the manuscript link causes retrieval and display of the manuscript within the graphical user interface. These may be implemented with reference to FIGS. 1-6.

Figure 8:
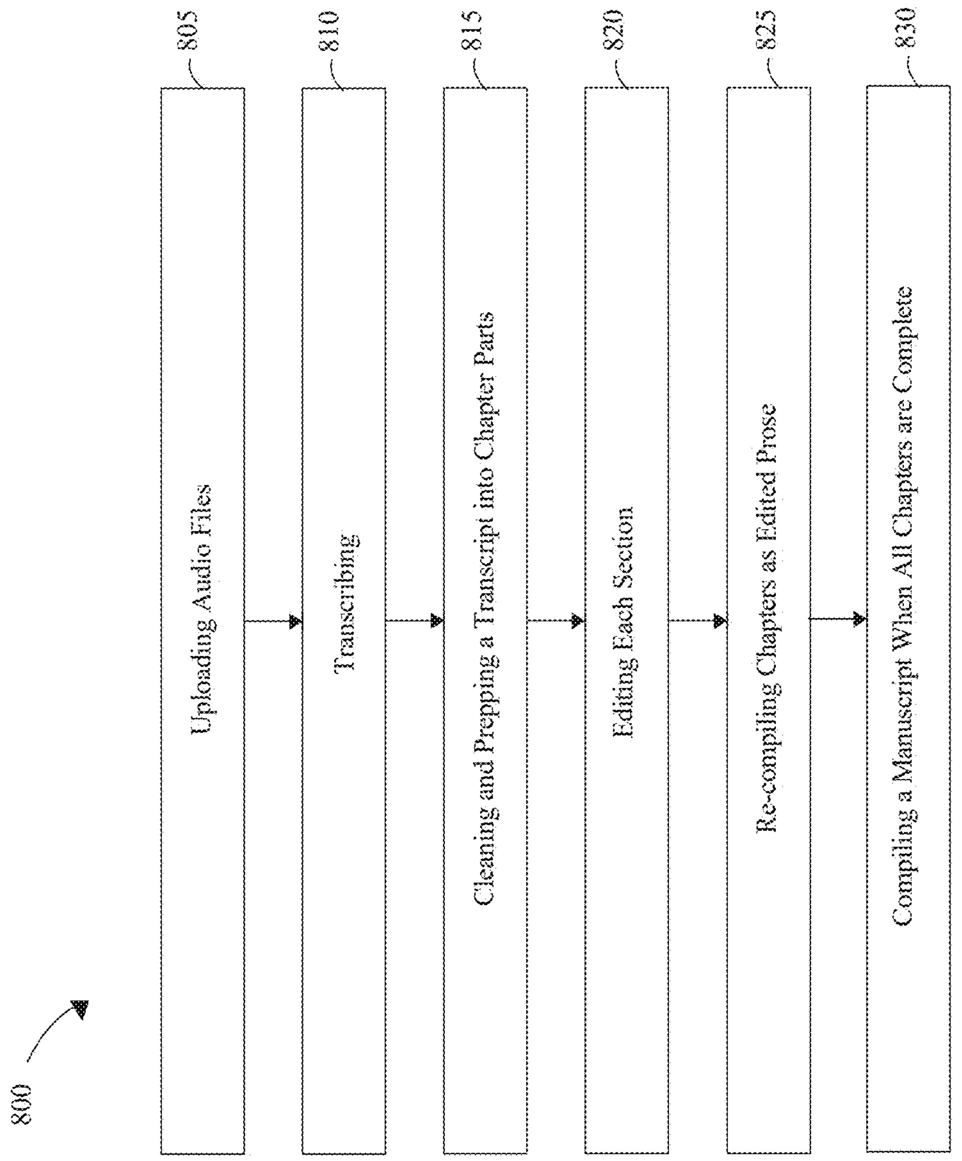
FIG. 8 illustrates a flow diagram of an exemplary method of machine-learning model configuration and FIG. 9 illustrates a block diagram of a computing system that can be used to implement any one or more of the methodologies disclosed herein and any one or more portions thereof.

Referring now to FIG. 8, a flow diagram of an exemplary method 800 of generating a manuscript from recorded speech sessions is illustrated. At step 805, audio files are uploaded. In some embodiments, the audio files may correspond to chapter-level recordings captured during directed recording sessions between an entity (e.g., an author) and a facilitator (e.g., a book director). Each audio file may represent a discrete chapter or section aligned with an outline segment of the manuscript structure. The audio may be recorded using a field recorder or other external recording device and subsequently uploaded through a graphical user interface or an automated ingestion service. These may be implemented as described and referenced with respect to FIGS. 1-7.

With continued reference to FIG. 8, at step 810, the uploaded audio files are transcribed. In some embodiments, processor may invoke an ASR module or a language model to convert the recorded speech data into textual transcripts. The transcription process may include isolating the audio stream, applying spectral transformations such as mel-frequency cepstral coefficients (MFCCs), and decoding audio features into textual elements. The resulting transcript may also include speaker tags distinguishing between entity and facilitator dialogue, as well as embedded structural hashtags introduced during recording (e.g., "#hook," "#thesis," "#takeaway"). These may be implemented as described and referenced with respect to FIGS. 1-7.

With continued reference to FIG. 8, at step 815, the transcript is cleaned and prepped into chapter parts. In some embodiments, the transcript is segmented according to outline segments 122 and associated metadata markers. Processor or an automation workflow may remove filler words, normalize punctuation, and divide the transcript into discrete sections corresponding to chapter subparts. This step may include applying articulation tags to identify misarticulate, rambling, or hybrid segments, which inform downstream editing strategies. These may be implemented as described and referenced with respect to FIGS. 1-7.

With continued reference to FIG. 8, at step 820, each section is edited, optionally through a human-AI hybrid orchestration layer. In some embodiments, the facilitator or an editor may review AI-refined transcript sections to adjust phrasing, ensure narrative coherence, and preserve the author's unique voice. Processor may perform light AI-assisted rewriting or stylistic refinement depending on articulation classification and predefined quality thresholds. These may be implemented as described and referenced with respect to FIGS. 1-7.

With continued reference to FIG. 8, at step 825, the system re-compiles the edited sections into chapter-level prose. Processor may merge the cleaned and refined transcript parts, apply structural formatting consistent with the outline instruction set, and generate metadata for chapter-level evaluation. In some embodiments, this re-compilation process may be triggered or managed through automation modules that combines and stores chapter drafts in a shared repository or versioned workspace. These may be implemented as described and referenced with respect to FIGS. 1-7.

With continued reference to FIG. 8, at step 830, the system compiles the completed chapters into a unified manuscript. Once all chapters are finalized, processor assembles them into a cohesive manuscript, optionally generating a table of contents, introduction, and conclusion based on outline. The compiled manuscript may include metadata such as manuscript scores, articulation statistics, and facilitator annotations, and may be output through graphical user interface for review or export. These may be implemented as described and referenced with respect to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
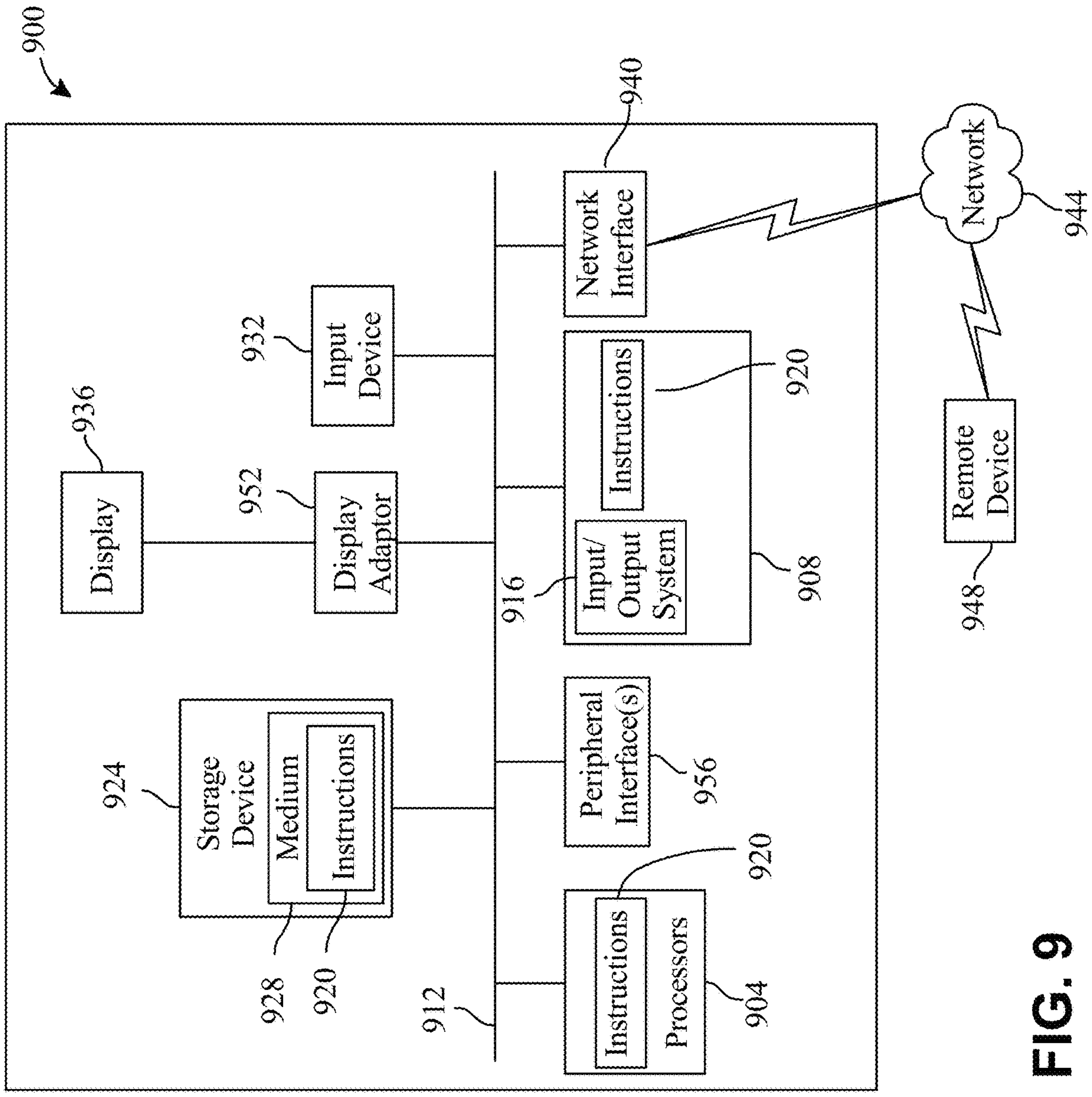

FIG. 9 shows a diagrammatic representation of one embodiment of a computing device in the exemplary form of a computer or computing system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulpo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof. Memory 908 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In some embodiments, storage device 924 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or more remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display 936. Examples of a display device include, but are not limited to, a liquid crystal display (LCD), a cathode ray tube (CRT), a plasma display, a light emitting diode (LED) display, and any combinations thereof. Display adapter 952 and display 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

Further referring to FIG. 9, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 9, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 9, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 900, processor 904, and memory 908 may be virtualized; that is, a virtual machine and/or container may interact directly with such computing system 900, processor 904, and/or memory 908, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 904 includes a plurality of processors and/or processor cores, virtualization may, in some cases, simulate or emulate a single (virtual) processor whose functions are allocated to one or more of the plurality of processors and/or processor cores. In this case, while processor 904 may be said to be virtualized, the processor 904, nevertheless, includes actual hardware processor(s) or portion(s) thereof. Accordingly, in this disclosure, where a processor is said to perform instructions, such processor may include a virtualized processor, including a plurality or portion of hardware processors. Likewise, in this disclosure, where a memory is said to contain (i.e., store) instructions, such memory may include a virtualized memory, including a plurality or portion of memories. Technologies that enable such virtualization include (1) QEMU; (2) VMware by Broadcom Inc of Palo Alto, California; (3) VirtualBox by Oracle Corporation headquartered in Austin, Texas; and (4) kernel-based virtual machine (KVM).

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for machine-learning model configuration, the apparatus comprising:

at least a processor; and a memory communicatively connected to the at least a processor, wherein the memory contains instructions configuring the at least a processor to:

receive prework data from an author associated with generation of a book;

generate a table of contents for the book comprising a plurality of outline segments using an outline model as a function of the prework data by seeding the outline model with categorized narrative units retrieved from a multi-perspective story vault, wherein generating the table of contents comprises:

retrieving a corpus of documents comprising a plurality of exemplary tables of contents associated with a plurality of books as a function of a plurality of retrieval thresholds;

extracting at least a document pattern from the corpus of documents, wherein extracting the at least a document pattern comprises generating a structural rule set representing ordering constraints and hierarchical relationships identified across the corpus of documents;

generating an instruction set for the outline model to generate tables of contents as a function the at least a document pattern;

configuring a behavior of the outline model as a function of the instruction set, wherein the outline model is configured to receive the prework data as an input and output the table of contents; and generating the table of contents as a function of the configured outline model and the prework data;

receive speech data in response to the generation of the outline;

generate a manuscript for the book as a function of the table of contents and the speech data, wherein generating the manuscript comprises:

segmenting the speech data to be aligned to the plurality of outline segments;

detecting a speech tone and at least a misarticulation element from the speech data; and synthesizing manuscript texts for each of the plurality of outline segments as a function of the segmented speech data, the speech tone and the at least a misarticulation element; and display a graphical user interface comprising the manuscript.

2. The apparatus of claim 1, wherein receiving the speech data comprises:

receiving a video; and extracting the speech data from the video using an automatic speech recognition module, wherein extracting the speech data comprises:

isolating an audio stream from the video;

extracting at least an audio feature from the audio stream using a spectral transformation; and decoding the at least an audio feature into a textual element.

3. The apparatus of claim 1, wherein receiving the speech data comprises routing the speech data as a function of a data size of the speech data, wherein routing the speech data comprises:

routing the speech data comprising the data size less than a size threshold to a language model configured to convert the speech data into a transcript; and routing the speech data comprising the data size greater than the size threshold to a segmentation model configured to partition the speech data into smaller segments.

4. The apparatus of claim 1, wherein detecting the at least a misarticulation element comprises:

generating a transcript using the speech data using a language model;

detecting a filler word from the transcript, wherein detecting the filler word comprises detecting a lexical token matching a filler dictionary and a prosodic pattern of speech pauses from the speech data; and removing the filler word from the transcript by realigning adjacent tokens.

5. The apparatus of claim 4, wherein detecting the at least a misarticulation element comprises using a misarticulation threshold, wherein exceeding the misarticulation threshold triggers insertion of a misarticulation tag into the transcript.

6. The apparatus of claim 1, wherein synthesizing the manuscript texts comprises:

assigning a delay interval for each of the plurality of outline segments based on a length of the segmented speech data and a system load parameter; and synthesizing the manuscript texts for each of the plurality of outline segments with the assigned delay interval.

7. The apparatus of claim 1, wherein generating the manuscript comprises:

generating a module instruction set as a function of parameters associated with the generation of the table of contents and the manuscript; and executing the module instruction set to trigger an activation of at least one of a plurality of processing modules, wherein each of the plurality of processing modules is configured to perform a task associated with the generation of the table of contents or the manuscript, wherein the task comprises invoking a language model to generate the manuscript.

8. The apparatus of claim 1, wherein segmenting the speech data comprises:

identifying at least a lexical token matching a segmentation dictionary from the speech data using a language processing module; and segmenting the speech data as a function of the at least a lexical token.

9. The apparatus of claim 1, wherein displaying the graphical user interface comprises:

generating a manuscript link associated with the manuscript; and generating the graphical user interface comprising a user profile comprising the manuscript link, wherein activation of the manuscript link causes retrieval and display of the manuscript within the graphical user interface.

10. The apparatus of claim 1, wherein the apparatus further comprises a recording device operated by a facilitator and receiving the speech data comprises receiving the speech data from the recording device.

11. A method of machine-learning model configuration, the method comprising:

receiving, using at least a processor, prework data from an author associated with generation of a book;

generating, using the at least a processor, a table of contents for the book comprising a plurality of outline segments using an outline model as a function of the prework data by seeding the outline model with categorized narrative units retrieved from a multi-perspective story vault, wherein generating the table of contents comprises:

retrieving a corpus of documents comprising a plurality of exemplary tables of contents associated with a plurality of books as a function of a plurality of retrieval thresholds;

extracting at least a document pattern from the corpus of documents, wherein extracting the at least a document pattern comprises identifying sequential relationships and hierarchical organization across the corpus of documents;

generating an instruction set for the outline model as a function the at least a document pattern;

configuring a behavior of the outline model as a function of the instruction set, wherein the outline model is configured to receive the prework data as an input and output the table of contents; and generating the table of contents as a function of the configured outline model and the prework data;

receiving, by the at least a processor, speech data in response to the generation of the table of contents;

generating, using the at least a processor, a manuscript for the book as a function of the table of contents and the speech data, wherein generating the manuscript comprises:

segmenting the speech data to be aligned to the plurality of outline segments;

detecting a speech tone and at least a misarticulation element from the speech data; and synthesizing manuscript texts for each of the plurality of outline segments as a function of the segmented speech data, the speech tone and the at least a misarticulation element; and displaying, using the at least a processor, a graphical user interface comprising the manuscript.

12. The method of claim 11, wherein receiving the speech data comprises:

receiving a video; and extracting the speech data from the video using an automatic speech recognition module, wherein extracting the speech data comprises:

isolating an audio stream from the video;

extracting at least an audio feature from the audio stream using a spectral transformation; and decoding the at least an audio feature into a textual element.

13. The method of claim 11, wherein receiving the speech data comprises routing the speech data as a function of a data size of the speech data, wherein routing the speech data comprises:

routing the speech data comprising the data size less than a size threshold to a language model configured to convert the speech data into a transcript; and routing the speech data comprising the data size greater than the size threshold to a segmentation model configured to partition the speech data into smaller segments.

14. The method of claim 11, wherein detecting the at least a misarticulation element comprises:

generating a transcript using the speech data using a language model;

detecting a filler word from the transcript, wherein detecting the filler word comprises detecting a lexical token matching a filler dictionary and a prosodic pattern of speech pauses from the speech data; and removing the filler word from the transcript by realigning adjacent tokens.

15. The method of claim 14, wherein detecting the at least a misarticulation element comprises using a misarticulation threshold, wherein exceeding the misarticulation threshold triggers insertion of a misarticulation tag into the transcript.

16. The method of claim 11, wherein synthesizing the manuscript texts comprises:

assigning a delay interval for each of the plurality of outline segments based on a length of the segmented speech data and a system load parameter; and synthesizing the manuscript texts for each of the plurality of outline segments with the assigned delay interval.

17. The method of claim 11, wherein generating the manuscript comprises:

generating a module instruction set as a function of parameters associated with the generation of the table of contents and the manuscript; and executing the module instruction set to trigger an activation of at least one of a plurality of processing modules, wherein each of the plurality of processing modules is configured to perform a task associated with the generation of the table of contents or the manuscript, wherein the task comprises invoking a language model to generate the manuscript.

18. The method of claim 11, wherein segmenting the speech data comprises:

identifying at least a lexical token matching a segmentation dictionary from the speech data using a language processing module; and segmenting the speech data as a function of the at least a lexical token.

19. The method of claim 11, wherein displaying the graphical user interface comprises:

generating a manuscript link associated with the manuscript; and generating the graphical user interface comprising a user profile comprising the manuscript link, wherein activation of the manuscript link causes retrieval and display of the manuscript within the graphical user interface.

20. The method of claim 11, wherein receiving the speech data comprises receiving the speech data from a recording device operated by a facilitator.

* * * * *